United States Patent
Pavela

(10) Patent No.: US 6,421,822 B1
(45) Date of Patent: Jul. 16, 2002

(54) GRAPHICAL USER INTERFACE FOR DEVELOPING TEST CASES USING A TEST OBJECT LIBRARY

(75) Inventor: Thomas J. Pavela, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/222,267

(22) Filed: Dec. 28, 1998

(51) Int. Cl.[7] .................................................. G06F 9/44
(52) U.S. Cl. ........................ 717/125; 717/109; 345/771; 345/970
(58) Field of Search ............................ 717/1, 2, 4, 100, 717/105–106, 109, 113, 124, 125, 135; 345/967, 352, 353, 326, 335, 970, 700, 762, 771, 809; 702/119, 108, 120; 714/739, 38; 706/45

(56) References Cited

U.S. PATENT DOCUMENTS

| | | | | |
|---|---|---|---|---|
| 5,390,325 | A | * 2/1995 | Miller | 714/38 |
| 5,651,111 | A | * 7/1997 | McKeeman et al. | 714/38 |
| 5,652,835 | A | * 7/1997 | Miller | 714/38 |
| 5,701,400 | A | * 12/1997 | Amado | 706/45 |
| 5,724,273 | A | * 3/1998 | Desgrousilliers et al. | 702/120 |
| 5,774,725 | A | * 6/1998 | Yadav et al. | 717/135 |
| 5,812,436 | A | * 9/1998 | Desgrousilliers et al. | 702/108 |
| 5,892,947 | A | | 4/1999 | DeLong et al. | 717/100 |
| 6,006,028 | A | | 12/1999 | Aharon et al. | 703/21 |
| 6,148,277 | A | | 11/2000 | Asava et al. | 703/22 |
| 6,182,258 | B1 | * 1/2001 | Hollander | 714/739 |

OTHER PUBLICATIONS

Doong, R. et al., "The ASTOOT Approach to Testing Object–Oriented Programs", ACM Transactions on Software Engineering and Methodology, vol. 3, No. 2, Apr. 1994, pp. 101–130.

Tan, Q.M. et al., "A Test Generation Tool for Specifications in the Form of State Machines", IEEE, Jun. 1996, pp. 225–229.

Software Engineering Technical Committee of the IEEE Computer Society, IEEE, Dec. 16, 1998, pp. i–iv, 1–52.

IBM Technical Disclosure Bulletin, "Test Case Generator", vol. 27, No. 5, Oct. 1, 1984, pp. 3153–3155.

IBM Technical Disclosure Bulletin, "Testing Interactive Graphics by Automatic Test Case Generation", vol. 26, No. 10B, Mar. 1, 1984, pp. 5695–5698.

IBM Technical Disclosure Bulletin, "Routine for Building a Test Case Generator", vol. 29, No. 7, Dec. 1, 1986, pp. 3189–3190.

* cited by examiner

Primary Examiner—Gregory Morse
Assistant Examiner—Hoang-Vu Antony Nguyen-Ba
(74) Attorney, Agent, or Firm—Gates & Cooper LLP

(57) ABSTRACT

A method, apparatus, article of manufacture, for generating a test code for an automatic procedure is disclosed. The method comprises the steps of presenting a visual representation of a library of executable code objects comprising a plurality of test objects to a user, accepting a selection of a first test object in the visual representation, presenting first test object options defining at least one test parameter, accepting a selection of a first test option, translating the first test option into at least one tag and at least one tag parameter, and storing the tag and the tag parameter in a source file. The article of manufacture comprises a data storage device tangibly embodying instructions to perform the method steps described above. The apparatus comprises computer with suitable program instructions for presenting a visual representation of a library of executable code objects to a user. The library of executable code objects includes a plurality of test object members, each of which define a set of instructions for performing a portion of the test procedure. The computer is also configured to implement a graphical user interface, to accepting a selection of a first test object in the visual representation, to present test options for the selected test object, and to accept a test object option.

21 Claims, 40 Drawing Sheets

:H3.SMQA01-9 1 IMS/CQS, non-response mode trans
        :hppartc tc= 'SMQA01-9'
        :***************************************************************
402 — :h4.Objectives
404 — :p.The purpose of the test is entered here.
406 — :h4.Scenario
408 — :ol compact.
410 — :li.The test scenario is entered here
412 — :eol.
414 — :h4.Procedure
416 — :ol compact.
418 — :li.Insert IT2 procedures here
420 — :eol.
422 — :h4.Verification
424 — :ol compact.
426 — :li.Testcase is self-verifying.
428 — :eol.
430 — :h4.System Configuration
432 — :ol compact.
434 — :li.This test case uses configuration___.
436 — :eol.
438 — :h4.Parts used by Test Case
440 — :insert parts used by Test Case
442 — :hpauthor aname= Insert author name

FIG. 4

```
:H3.SMQA01-9 1 IMS/CQS, non-response mode trans
:hppartc tc= 'SMQA01-9'
*********************************************************************
:
:h4.Objectives
:p.The purpose of the test is to validate that transactions can be processed
on the Shared Message Queue. This test case will queue up non-response
mode transactions on the queue and process them.
:h4.Scenario
:ol compact.
:li.Start up a 1-way SYSPLEX with 1 Coupling Facility
:li.Initialize the RECONS and Load the DA Data Base share level 3
:li.Start IRLM 2.1
:li.Cold start 1 IMS/CQS.
:li.Submit 1000 non-response mode transactions
:li.Start application program
:li.Submit another 500 non-response mode transactions
:li.Shutdown IMS after work is processed
:eol.
:h4.Procedure
:ol compact.
:li.Insert IT2 procedures here
:eol.
:h4.Verification
:ol compact.
:li.Testcase is self-verifying.
:eol.
:h4.System Configuration
:ol compact.
:li.This test case uses configuration 30.
:eol.
:h4.Parts used by Test Case
:hppartp
:hpauthor aname= 'Tom Pavela"
```

500 — (entire figure)

502 — Objectives paragraph

504 — Scenario list items

FIG. 5

:H3.SMQA01-9 1 IMS/CQS, non-response mode trans
:hppartc tc= 'SMQA01-9'
:*******************************************************************************
:h4.Objectives
:p.The purpose of the test is to validate that transactions can be processed on the Shared Message Queue. This test case will queue up non-response mode transactions on the queue and process them.
:h4.Scenario
:ol compact.
:li.Start up a 1-way SYSPLEX with 1 Coupling Facility
:li.Initialize the RECONS and Load the DJK Data Base share Level 3
:li.Start IRLM 2.1
:il.Cold start 1 IMS/CQS.
:li.Submit 1000 non-response mode transactions
:li.Start application program
:li.Submit another 500 non-response mode transactions
:li.Shutdown IMS after work is processed
:eol.
:h4.Procedure
:ol compact.

| | | |
|---|---|---|
| 602A :HPENTRY | CONFIG=30 | 602B |
| 604A :HPLOAD | DB='DJK' SHRL=3 | 604B |
| 606A :HPSRLM2 | ON=ALL | 606B |
| 608A :IMSSTART | ON=ALL DB='DJK' RE=NRE | 608B |
| | CFNAMES1 ='CFNAMES,CFIRLM=LT01,CFVSAM=,CFOSAM=OSAMSESXI' | |
| 610A :TMSCNTI | ON=ALL NTRANS=1000 | 610B |
| 612A :TMSCNTI | ON=ALL NTRANS=500 | 612B |
| 614A :IMSSTOP | ON=ALL | 614B |
| 616A :HPEXIT | | 616B |

:eol.
:h4.Verification
:ol compact.
:li.Testcase is self-verifying.
:eol.
:h4.System Configuration
:ul compact.
:li.This test case uses configuraton 30.
:eul.
:h4.Parts used by Test Case
:hppartp
:hpauthor aname= 'Tom Pavela"

FIG. 6

SMQA01-9 1 IMS/CQS, NON-RESPONSE MODE TRANS
Objectives
   The purpose of this test is to validate that transactions can be processed on the Shared Message Queue.
   This test case will queue up non-response mode transactions on the queue and process them.
Scenario
   1. Start up a 1-way SYSPLEX with 1 Coupling Facility
   2. Initialize the RECONS and Load the DJK Data Base share level 3
   3. Start IRLM 2.1
   4. Cold start 1 IMS/CQS.
   5. Submit 1000 non-response mode transactions
   6. Start application program
   7. Submit another 500 non-response mode transactions
   8. Shutdown IMS after work is processed
Procedure
   1. Call Hpcs_entry using configuration 30 and ARM= NO and ARCDEFLT= YES and RECVTAM= YES
   2. Call Hpcs_load_databases which will:
       a. Define the shared RECON data sets
       b. Run the load database job(s) to load database(s) DJK and register the data bases as share level -3
   3. Call Hpcs_Start_IRLMs_21 which will:
       a. Start IRLM 2.1 on all CECS with a lock structure of LT01
   4. Call Start_IMS_on_all_systems which will:
       a. Run HPC$SPEC MODEL to update the VSPEC member on all CECs with
          (CFNAMES,CFIRLM=LT01,CFVSAM=,CFOSAM=OSAMSESXI)
       b. Run IMS%CSA% MVSPROC to bring up IMS TM/DB region on all CECs with CQS using VCATSHR.
       c. After DFS810A message is displayed, issue "/NRE CHKPT 0 FORMAT ALL." Wait for cold start to
          complete.
             1) Issue IMS command "/STOP DB DBHDOJ01"
             2) Issue IMS command "/STOP DB DBHDOK01"
             3) Issue IMS command "/START DB DBHDOJ01 ACCESS=UP"
             4) Issue IMS commanD "/START DB DBHDOK01 ACCESS=UP"

FIG. 8A

5. Call Start_Transaaction_Scenario_1 which will:
    a. Submit 1000 non-response mode transactions (HPCSTCL1) on all CECs
    b. Issue the IMS / START PROGRAM HPC$M$00 command on all CECs
    c. Wait for all Scenario 1 transactions to be processed, then verify the transaction counter is correct.
6. Call Start_Transaction_Scenario_ 1 which will:
    a. Submit 500 non-response mode transactions (HPCSTCL1) on all CECs
    b. Issue the IMS / START PROGRAM HPC$M$00 command on all CECs
    c. Wait for all Scenario 1 transactions to be processed, then verify the transaction counter is correct.
7. Call Stop_all_IMSs which will:
    a. Issue a "/CHE FREEZE" to bring down the IMS control region on all CECs
    b. When IMS control region on all CECs completes, verify all condition codes to be zero.
    c. In Shared Queues configurations when CQS region on all CECs completes, verify all condition codes to be zero.
8. Call Hpcs_Exit routine Verification
    1. Testcase is self-verifying.
System configuration
    o  This test case uses configuration 30.
Parts used by Test Case
    CFCPLOAD PROCEDURE
    RCN%CSA% PROCEDURE
    HPC$L05 MODEL
    LOADDJK PROCEDURE
    IRLME2N PROCEDURE
    HPC$SPEC MODEL
    IMS%CSA% PROCEDURE
    SMQ$C19X MVSPROC
    SMQ$BMP JCL
    HPC$TPNS MODEL
    HPC$MPP MODEL
    HPC$JOB EXEC
Author: Tom Pavela

FIG. 8B

```
/****************************************************************************/
/*SMQA01-9 1 IMS/CQS, non-response mode trans                              */
/****************************************************************************/
/*                                                                          */
/*   Objectives                                                             */
/*                                                                          */
/*      The purpose of this test is to validate that transactions can be    */
/*      processed on the Shared Message Queue. This test case will queue    */
/*      up non-response mode transactions on the queue and process them.    */
/*                                                                          */
/*   Scenario                                                               */
/*                                                                          */
/*         Start up a 1-way SYSPLEX with 1 Coupling Facility                */
/*         Initialize the RECONS and Load the DJK Data Base share level     */
/*         3                                                                */
/*                                                                          */
/*         Start IRLM 2.1                                                   */
/*                                                                          */
/*         Cold start 1 IMS/CQS.                                            */
/*                                                                          */
/*         Submit 1000 non-response mode transactions                       */
/*                                                                          */
/*         Start application program                                        */
/*                                                                          */
/*         Submit another 500 non-response mode transactions                */
/*                                                                          */
/*         Shutdown IMS after work is processed                             */
/*                                                                          */
```

FIG. 9A

```
/************************************************************************/
/* This TC requires that an EC machine be ipled and executing in a      */
/*                                                                       */
/*======================================================================*/
/* SECURITY               : IBM INTERNAL USE ONLY                       */
/*======================================================================*/
/* =                                                                    */
/* TESTCASE NAME          : "SMQA01-9"                                  */
/*======================================================================*/
/* =                                                                    */
/* SOURCE FILE            : "SMQA01-9 SCRIPT A1"                        */
/*======================================================================*/
SESSION=SESSION
GLOBAL    SetVars MoreHold DoReply DoWait TimeOut SwitchEC ATIRUN
GLOBAL    MVSPROC ATIVER TransVer MVSCmd CPCmd GoCP LeaveCP GetPRTAll
GLOBAL    ResetPorts DialPorts LogLine
GLOBAL    DoWaitSwap ATISwap MVSCmdSwap
/************************************************************************/
/* Hpcs subroutine library                                              */
/*----------------------------------------------------------------------*/
GLOBAL CONFIGURATION    /*: determines #ECs & #CFs & struct location  */
GLOBAL DATABASES        /*: determines databases to load and access   */
GLOBAL CFNAMES1         /*: CFNAMES card #1 used by HPC$VSPEC         */
GLOBAL CFNAMES2         /*: CFNAMES card #2 used by HPC$VSPEC         */
GLOBAL OPTIONS          /*: IRLM 2.1 options (start_a_Irlm only)      */
GLOBAL DBDLIST          /*: dbdlist at hpcs_entry                     */
GLOBAL ACBLIB           /*: acblib at hpcs_entry, psb will be gened to */
GLOBAL HPCLIST          /*: psblist at hpcs_entry                     */
GLOBAL HPCSTRCE         /*: TRACE value while in HPC$SUB              */
/*---------------------------Scenario variables-------------------------*/
```

FIG. 9B

```
GLOBAL HPCSLOG          /*: LOG causes Scenario logging to OLDS      */
GLOBAL HPCSTRAN         /*: #trans to use in Scenario 1-350          */
                        /* Scenarios 4, 5 <176 else <351             */
GLOBAL HPCSMPPS         /* The number of Mpps to be used by          */
                        /* database type, 1, 2 or 3 (def=3)          */
GLOBAL HPCSVER          /* ='Yes' verify environment, ='No', goto    */
                        /* check all messages processed loop         */
GLOBAL HYPER            /* Yes--use VSAM Hyper space                 */
GLOBAL SHARER           /* Yes--start 2nd IMS                        */
GLOBAL MODEL            /* Mvscmd model proc                         */
GLOBAL NUMPARTS         /* Number of Partitions                      */
GLOBAL RESLIB           /* IMS reslib                                */
GLOBAL PARM1            /* IMS parm1                                 */
GLOBAL PARM2            /* IMS parm2                                 */
GLOBAL RESTART_VTAM     /* restart_vtam=yes/no for recycled vtam in entry */
GLOBAL VSPEC            /* IMS VSPEC                                 */
GLOBAL PROCNAME         /* IMS PROCNAME                              */
GLOBAL CEC1_RESLIB      /* CEC1 RESLIB                               */
GLOBAL CEC2_RESLIB      /* CEC2 RESLIB                               */
GLOBAL CEC3_RESLIB      /* CEC3 RESLIB                               */
GLOBAL Scenario2_log    /* TMSCNTX Scenario2 _Log                    */
GLOBAL Scenario3_log    /* TMSCNTX Scenario3 _Log                    */
GLOBAL Scenario4_log    /* TMSCNTX Scenario4 _Log                    */
GLOBAL Scenario5_log    /* TMSCNTX Scenario5 _Log                    */
GLOBAL Scenario6_log    /* TMSCNTX Scenario6 _Log                    */
GLOBAL Scenario7_log    /* TMSCNTX Scenario7 _Log                    */
GLOBAL Scenario8_log    /* TMSCNTX Scenario8 _Log                    */
GLOBAL Scenario9_log    /* TMSCNTX Scenario9 _Log                    */
GLOBAL ScenarioA_log    /* TMSCNTX ScenarioA _Log                    */
GLOBAL ScenarioB_log    /* TMSCNTX ScenarioB _Log                    */
GLOBAL ScenarioC_log    /* TMSCNTX ScenarioC _Log                    */
GLOBAL ScenarioD_log    /* TMSCNTX ScenarioD _Log                    */
GLOBAL ScenarioE_log    /* TMSCNTX ScenarioE _Log                    */
```

FIG. 9C

```
GLOBAL ScenarioF_log          /* TMSCNTX ScenarioF _Log                      */
GLOBAL ScenarioG_log          /* TMSCNTX ScenarioG _Log                      */
GLOBAL ScenarioH_log          /* TMSCNTX ScenarioH _Log                      */
GLOBAL ScenarioI_log          /* TMSCNTX ScenarioI _Log                      */
GLOBAL ScenarioJ_log          /* TMSCNTX ScenarioJ _Log                      */
GLOBAL ScenarioK_log          /* TMSCNTX ScenarioK _Log                      */
GLOBAL ScenarioL_log          /* TMSCNTX ScenarioL _Log                      */
GLOBAL CQSWTOR1               /* CQSWTOR1                                    */
GLOBAL ARCDEFLT               /* Archive member default                      */
GLOBAL NumofTerm_to_Use       /* Num of Terminal to use for Scenario 1-10    */
GLOBAL ARM                    /* ARM policy                                  */
GLOBAL ShareDB                /* Share DB YES-Global No-Local                */
GLOBAL IMSLOCAL               /* Local IMS?                                  */
GLOBAL RSRMBR                 /* RSRMBR RSR Member                           */
GLOBAL DELSLDS                /* DELSLDS Delete SLDS                         */
GLOBAL RLVL                   /* RLVL Readiness level                        */
GLOBAL HPCSFRCE               /* routine in HPC$CMD to cleanup structures    */
/*******************************************************************************/
/*----------------------------------Called Commands-----------------------------*/
-
GLOBAL   SwitchEC
GLOBAL   Hpcs_entry
GLOBAL   Hpcs_load_databases
GLOBAL   Hpcs_Start_IRLMs_21
GLOBAL   Start_IMS_on_all_systems
GLOBAL   Start_Tran_Scenario_1
GLOBAL   Stop_all_IMSs
GLOBAL   Hpcs_exit
GLOBAL   Hpcs_clear
GLOBAL   Hpcs_clear_all
GLOBAL   Hpcs_logit
```

FIG. 9D

```
/*=====================begin test case=========================*/
/*------------------------------->>> EC1 <<<----------------------------------*/
Call SwitchEC "EC1"
CONFIGURATION=30
RESTART_VTAM="YES"
ARCDEFLT="YES"
ARM="NO"
Call Hpcs_entry " "
/* load the database(s) using sharelevel 3                                 */
DATABASES=" DJK"
ShareDB="YES"                                      ⎯⎯ 910
Call Hpcs_load_databases "3 "
Call Hpcs_Start_IRLMs_21 " "
/*****************************************************************************/
/* Cold start IMS TM_DB region on ALL system(s)                            */
/* CQS will be started and the default model is SMQ$C19X.                  */
/* The following IMS parms will be used if they are not set by the         */
/* user in IMSPARMS:                                                       */
/*     IRLM=Y, VSPEC=HP, IMSID=IMSx                                        */
/*     SHAREDQ=%%x, DC=COx                                                 */
/*         note: x is 1,2, or 3 depending on which CEC                     */
/*     DLINM=HPC%CSA% (if DBDLIST or PSBLIST is specified in HPENTRY) */
/*****************************************************************************/
CFNAMES1='CFNAMES, CFIRLM=LT01, CVSAM=, CFOSAM=OSAMSESXI'
CFNAMES2="NO"
DATABASES=" DJK "
SHARER="NO"
HYPER="NO"
IMSLOCAL="N"
RESLIB="C"
PROCNAME="DEFAULT"
PARM1=" "
PARM2=" "
VSPEC="DEFAULT"
MODEL="DEFAULT"
Call Start_IMS_on_all_systems
Call Start_Tran_Scenario_1 "LEAVE=NO NTRANS=1000 ON=ALL STARTAPL=ALL"
Call Start_Tran_Scenario_1 "LEAVE=NO NTRANS=500 ON=ALL STARTAPL=ALL"
     Call Stop_all_IMSs "    "
Call Hpcs_exit " "
/*======================end test case=========================*/
EXIT 0
INCLUDE "HPC$SUB"
/*===================HPTC Translation summary===================*/
/* Number of lines written  = ...176                                       */
/* Number of +++ errors     = .......0                                     */
/*===================End Translation summary===================*/
```

FIG. 9E

```
.* ******************************************************************
.* IMS Test Object Change History                    *
.*
.* ******************************************************************
.*
.* ******************************************************************
.* HPSRLM2 Macro Start IRLM 2.1 on indicated CEC     *
.* ******************************************************************
.gs rules (vat)
.aa HPSRLM2 HPSRLM2
.dm HPSRLM2 on
.gs attval ON as *onn
.gs attval OPTIONS as *opt
.*-----------------------------------------------------------------
.if &e'&*onn = 0
.th .go error
.if &u'&*onn = ALL
.th .go all
.if &l'&*onn = 4
.th .go scec
.el .go mcec
.*-----------------------------------------------------------------
...all
:li.Call Hpcs_Start_IRLMs_21 which will:
:ol compact.
:li.Start IRLM 2.1 on all CECS with a lock structure of LT01
.go cont1
.*-----------------------------------------------------------------
...scec
.if &e'&*opt = 1
.th .go popt
:li.Call Hpcs_Start_an_IRLM_21 which will:
:ol compact.
:li.Start IRLM 2.1 on &u'&*onn with a lock structure of LT01
.go cont1
.*-----------------------------------------------------------------
...popt
:li.Call Hpcs_Start_an_IRLM_21 which will:
:ol compact.
:li.Start IRLM 2.1 on &u'&*onn specifying the following options;
&u'&*opt
.go cont1
```

FIG. 30A

```
.*-----------------------------------------------------------
...mcec
:li.Call Hpcs_Start_an_IRLM_21 which will:
:ol compact.
:li.Start IRLM 2.1 on &u'&*onn with a lock structure of LT01
.*--------------------Process Parts Used--------------------
...cont1
:eol.
.se fn = 'IRLME2N'
.se ft = PROCEDURE
.hpchkpt
.se *fn1 = 'IRLM
.se *fn2 = 2.1
.se fn = &*fn1.&*fn2
.hpadfun
.go done
.*-----------------------------------------------------------
...error
:li.+++ERROR in HPSRLM2 INVALID ON Parameter**********
.*-----------------------------------------------------------
...done
.dm off
.* *******************************************************************
.* End of HPSRLM2 Macro                                               *
.* *******************************************************************
.
```

FIG. 30B

```
HPSRLM2: /*ON=(CECx,ALL) LOCKTAB=1 GROUP=g IRLMID=i  */
   Call Parse_variables
   upper on
   if result>1 then return result
   If Totall-=on1+options1 then return 6
   If on1=0 then return 7
   If options1-=0 & on='ALL' then return 18
   If options1-=0 & onn>1 then return 18
   data=eighty_blanks
   call Put_line_on_Stack
   Call Put_line_on_stack
   If on='ALL' then do
      Data ='Call Hpcs_Start_IRLMs_21' """
      Call Put_line_on_stack
      end
   If onn>1 then do
      do j=1 to onn
         work_ec = substr(word(on,j),2,3)
         Call Check_current_ec
         Data ='Call Hpcs_Start_an_IRLM_21' """
         Call Put_line_on_stack
         end
      end
   If onn=1 & on-='ALL' then do
      work_ec = substr(on,2,3)
      Call Check_current_ec
      If options1>0 then do
         Work_String=options
         Call Remove_High_Values
         options = Work_String
         Data = 'OPTIONS='||""||options||""
         Call Put_line_on_stack
         end
      Data ="Call Hpcs_Start_an_IRLM_21' """
      Call Put_line_on_stack
      end
   Call Add_Library 'HPC$SUB'
return
```

FIG. 31

```
/****************************************************************&START&*/
/* Routine Name: Hpcs_start_irlms_21                             */
/* Called by:                                       */
/* Parameters passed:                               */
/* Routines called:                                 */
/* Routine Function:                                */
/****************************************************************&END&***/
Hpcs_start_irlms_21:
   Call Save_callers_environment
   Call Hpcs_logit 'Hpcs_start_irlms_21 started'
   If Options-='' & Options-='Options' then do
      Call Hpcs_logit 'Options may not be specified when'
      Call Hpcs_logit 'starting "all" Irlms 2.1'
      goto Hpcs_test_case_aborted
   end
   Irlm_process='Start'
   Call Process_all_irlms
   Call Restore_callers_environment
   Return 0

/****************************************************************&START&*/
/* Routine Name: Process_all_Irlms                              */
/* Called by:                                       */
/* Parameters passed:                               */
/* Routines called:                                 */
/* Routine Function:                                */
/****************************************************************&END&***/
Process_all_Irlms:
   ec=1
   do until forever=true
      CMS 'GLOBALV SELECT MULTIEC STACK EC'ec
      Pull NewEC
      if Index(' 'Sessions' ',' 'NewEC' ')=0 or,
      ec>Maxcec or,
      NewEC='' then do
         Goto Process_all_Irlms_exit
      end
      CMS 'GLOBALV SELECT DOAUTO SET SESSION' NewEC
      CMS 'GLOBALV SELECT DOAUTO SET ECID' NewEC
      Session=NewEC
      Call Process_an_Irlm
      ec=ec+1
   end
```

FIG. 32A

```
        goto Process_all_Irlms_exit
Process_all_Irlms_exit:
     return

/*******************************************************************&START&*/
/* Routine Name: Process_an_Irlm                          */
/* Called by:                                 */
/* Parameters passed:                             */
/* Routines called:                              */
/* Routine Function:                              */
/*******************************************************************&END&***/
Process_an_Irlm:
   If Irlm_process='Start' then do
      Call Hpcs_clear_all
      Call Get_irlm_21_Options
      Send 'S IRLME2N,'||Irlm_21_Options
      Wait #1
      Call Hpcs_logit 'Starting IRLME2N on '||NewEC
      Call Hpcs_logit Irlm_21_Options
      hpcs_onerror=onerror
      onerror=False
    CALL DOWAIT '5 1 IRLM INITIALIZATION COMPLETE'
/*    Wait #9:00 Scrhas('RLM INITIALIZATION COMPLETE')
      Wait_rc=rc
      onerror=hpcsonerror
      If Wait_rc=0 then do
         hpcs_onerror=onerror
         onerror=False
         Wait #10 Scrhas('ABEND=S000 U2018')
         Wait_rc=rc
         onerror=hpcs_onerror
         If Wait_rc=1 then do
            Call Hpcs_logit 'Start Irlm issued with active IRLM"s'
            goto Hpcs_test_case_aborted
         end goto Hpcs_test_case_aborted
      end
/*
      Goto Process_an_Irlm_Exit
   end If Irlm_process='Cancel' | Irlm_process='Stop' then do
      Call Hpcs_clear_all
      Send 'D A,L'||ENTER
```

FIG. 32B

Wait #10 Scrhas('IEE114I')
hpcs_onerror=onerror
onerror=False
/*********************************************************************/
/* look for RLM after IEE114I message            */
/*********************************************************************/
Wait #0 Scrhas('RLM' (HITROW +1:1) (MAXROW : MAXCOL))
Wait_rc=rc

FIG. 32C

GRAPHICAL USER INTERFACE FOR DEVELOPING TEST CASES USING A TEST OBJECT LIBRARY

CROSS-REFERENCE TO RELATED APPLICATIONS

This application is related to the following co-pending and commonly assigned patent application, which application are incorporated by reference herein:

Application Ser. No. 09/221,389, entitled "SYSTEM AND METHOD FOR DEVELOPING TEST CASES USING A TEST OBJECT LIBRARY," filed on Dec. 28, 1998, by Thomas J. Pavela.

BACKGROUND OF THE INVENTION

1. Field of the Invention

The present invention relates to systems and methods of generating test cases, and in particular to a method and system for generating test cases using a test object library.

2. Description of the Related Art

The past two decades have seen a rapid proliferation of computer application programs. To be competitive, software applications must be responsive to customer's rapidly evolving needs, and must be as bug-free as possible. One method of assuring that a software release is bug free by testing the software with a wide variety of test cases, carefully chosen to test all critical modules in the software product. Such testing procedures are especially important where the software under test is designed to operate across a number of processors or other systemns operating in parallel. In such cases, the individuals writing the test cases should be familiar the operating system or communication protocols for all of the elements in the system. Unfortunately, there are few individuals with all of the skills necessary to write a complete test program.

The development and execution of software test cases also takes an large investment of time and resources, and can delay the timely introduction of a software product to the marketplace. Because software applications are written and sold in a highly competitive environment, there is an urgent need to reduce the cost and time involved in testing software.

Typically, the process of developing software test procedures begins with the generation of a test plan with test objectives and procedures. That test plan is published and subject to review. If the test plan is approved, detailed automated test code is written. Invariably, the test code does not function as desired, and changes must be made to the code, often implicating major changes in the test plan as well. However, in the rush to bring the software product to market, it often occurs that the test plan is never updated to reflect the new test procedures. Even if the exigencies of the situation permit the test plan to be updated, this effort usually involves a significant amount of time and money.

What is needed is an improved system and method for developing test cases. The present invention satisfies that need by offering a system that relieves the system test designer from writing the automated code from scratch. Instead, the test designer is provided with a library of test objects, each implementing a portion of the automated test procedure. When one of the objects in the library are selected, the user is prompted to select from test object options that define required test parameters, thus simplifying the process. The system and method for developing test cases also relieves the test case designer from the burden of familiarizing themselves with the protocols and interoperability requirement for each and every system element used by the software, and allows the test plan to be updated and documented with significantly less effort.

SUMMARY OF THE INVENTION

To address the requirements described above, the present invention discloses a method, apparatus, article of manufacture, for generating a test code for an automatic procedure.

The method comprises the steps of presenting a visual representation of a library of executable code objects comprising a plurality of test objects to a user, accepting a selection of a first test object in the visual representation, presenting first test object options defining at least one test parameter, accepting a selection of a first test option, translating the first test option into at least one tag and at least one tag parameter, and storing the tag and the tag parameter in a source file. The article of manufacture comprises a data storage device tangibly embodying instructions to perform the method steps described above.

The apparatus comprises means for presenting a visual representation of a library of executable code objects to a user. The library of executable code objects includes a plurality of test object members, each of which define a set of instructions for performing a portion of the test procedure. Nominally, the means for performing these functions comprises a computer implementing suitable program instructions. The apparatus also comprises means, such as a computer implementing a graphical user interface, for accepting a selection of a first test object in the visual representation, presenting test options for the selected test object, and accepting a test object option. The apparatus also comprises a means for translating the first test option into one tag and at least one tag parameter, which is stored in a source file.

BRIEF DESCRIPTION OF THE DRAWINGS

Referring now to the drawings in which like reference numbers represent corresponding parts throughout:

FIG. 4 is a diagram showing an illustrative embodiment of a template for the script file;

FIG. 5 is an example of a script file template after the test purpose and the test scenario have been inserted into the source file by the user;

FIG. 6 is an example of a source file template after a plurality of test procedure commands have been inserted into the source file template;

FIGS. 8A and 8B are diagrams showing a test plan generated from the source file shown in FIG. 6;

FIGS. 9A–9E are diagrams showing a listing of an automated test code generated from the script file shown in FIG. 6;

FIGS. 30A and 30B are representative code instructions for a script macro;

FIG. 31 presents an example of software code used to translate a test object into test code; and FIGS. 32A–C presents an example of subroutine in the automated executable subroutine library, which may be called by the test code.

DETAILED DESCRIPTION OF PREFERRED EMBODIMENT

In the following description, reference is made to the accompanying drawings which form a part hereof, and which is shown, by way of illustration, several embodiments of the present invention. It is understood that other embodiments may be utilized and structural changes may be made without departing from the scope of the present invention.

Hardware Environment

Figure 1:
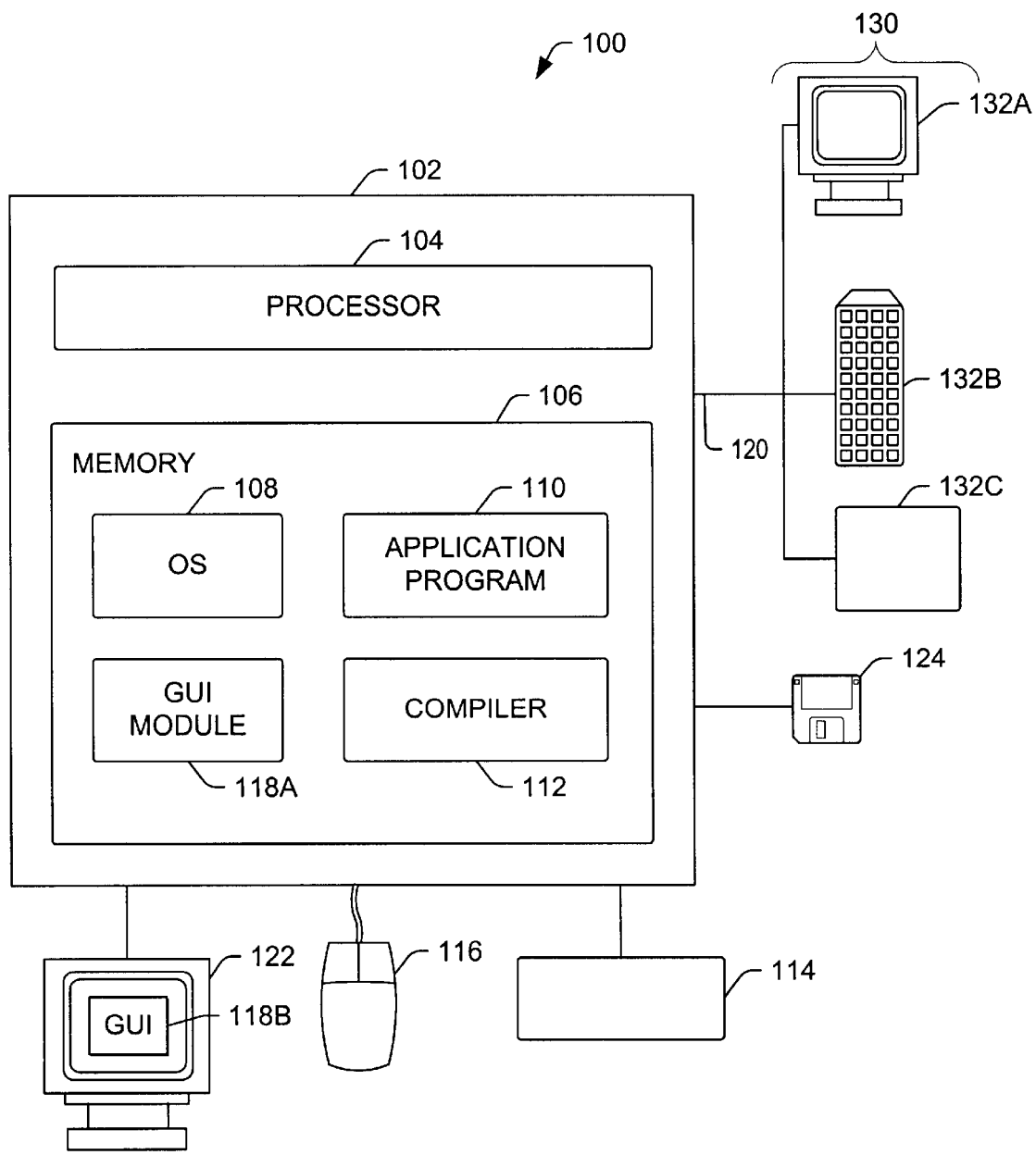
FIG. 1 is a block diagram showing an exemplary hardware environment for practicing the present invention.

FIG. 1 illustrates an exemplary computer system 100 that could be used to implement the present invention. The computer 102 comprises a processor 104 and a memory, such as random access memory (RAM) 106. The computer 102 is operatively coupled to a display 122, which presents images such as windows to the user on a graphical user interface 118B. The computer 102 may be coupled to other devices, such as a keyboard 114, a mouse device 116, a printer, etc. Of course, those skilled in the art will recognize that any combination of the above components, or any number of different components, peripherals, and other devices, may be used with the computer 102.

Generally, the computer 102 operates under control of an operating system 108 stored in the memory 106, and interfaces with the user to accept inputs and commands and to present results through a graphical user interface (GUI) module 118A. Although the GUI module 118A is depicted as a separate module, the instructions performing the GUI functions can be resident or distributed in the operating system 108, the application program 110, or implemented with special purpose memory and processors. The computer 102 also implements a compiler 112 which allows an application program 110 written in a programming language such as COBOL, C++, FORTRAN, or other language to be translated into processor 104 readable code. After completion, the application 110 accesses and manipulates data stored in the memory 106 of the computer 102 using the relationships and logic that was generated using the compiler 112.

In one embodiment, instructions implementing the operating system 108, the computer program 110, and the compiler 112 are tangibly embodied in a computer-readable medium, e.g., data storage device, which could include one or more fixed or removable data storage devices, such as a zip drive, floppy disc drive 124, hard drive, CD-ROM drive, tape drive, etc. Further, the operating system 108 and the computer program 110 are comprised of instructions which, when read and executed by the computer 102, causes the computer 102 to perform the steps necessary to implement and/or use the present invention. Computer program 110 and/or operating instructions may also be tangibly embodied in memory 106 and/or data communications devices, thereby making a computer program product or article of manufacture according to the invention. As such, the terms "article of manufacture" and "computer program product" as used herein are intended to encompass a computer program accessible from any computer readable device or media.

In one embodiment, the computer 102 is communicatively coupled to a system 130 comprising one or more system elements which may include, for example, a remote computer 132A, a remote server 132B, or a test device or test interface 132C (collectively known hereinafter as system elements 132). Portions of the application program 110 may be executed by the system elements 132 as well as the computer 102, thus implementing a parallel processing structure. The application program 110 may also include a series of instructions to command one or more of the system elements 132.

Those skilled in the art will recognize many modifications may be made to this configuration without departing from the scope of the present invention. For example, those skilled in the art will recognize that any combination of the above components, or any number of different components, peripherals, and other devices, may be used with the present invention.

Overview

Figure 2:
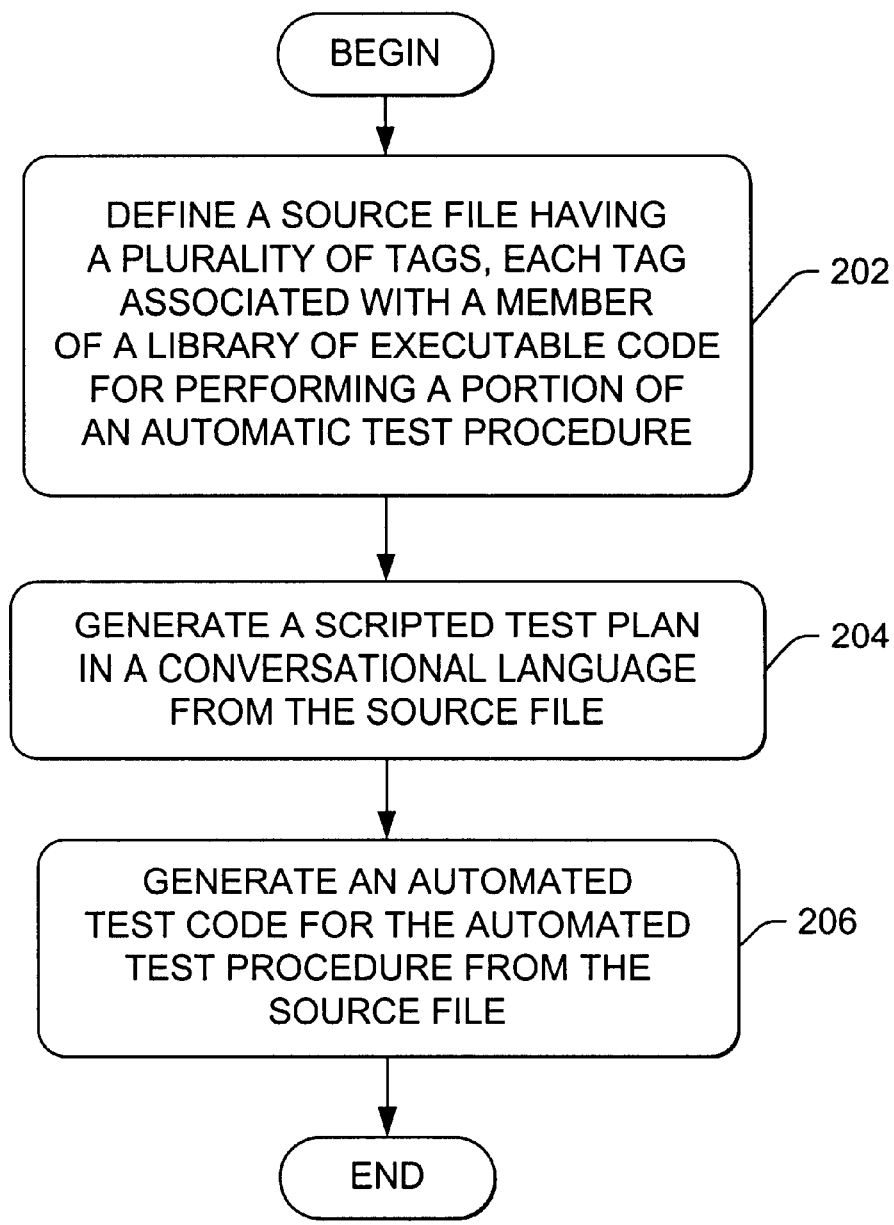
FIG. 2 is a flow chart presenting an overview of the process steps used to practice one embodiment of the present invention.

FIG. 2 is a flow chart presenting an overview of the process steps used to practice one embodiment of the present invention. First, the process begins by defining a source file 318 having a plurality of tags, as shown in block 202. Each tag is associated with a member of a library of executable code objects for performing a portion of an automatic test procedure for the system 130. The source file 318 is used to generate 204 a test plan 322. The test plan 322 is a document which, in conversational language, describes the test objectives, procedures, scenario, and other important information about the test case. The test plan 322 is usually published for review by a test review team. If test plan 322 is accepted, an automated test code is generated 206 from the source file 318.

Figure 3:
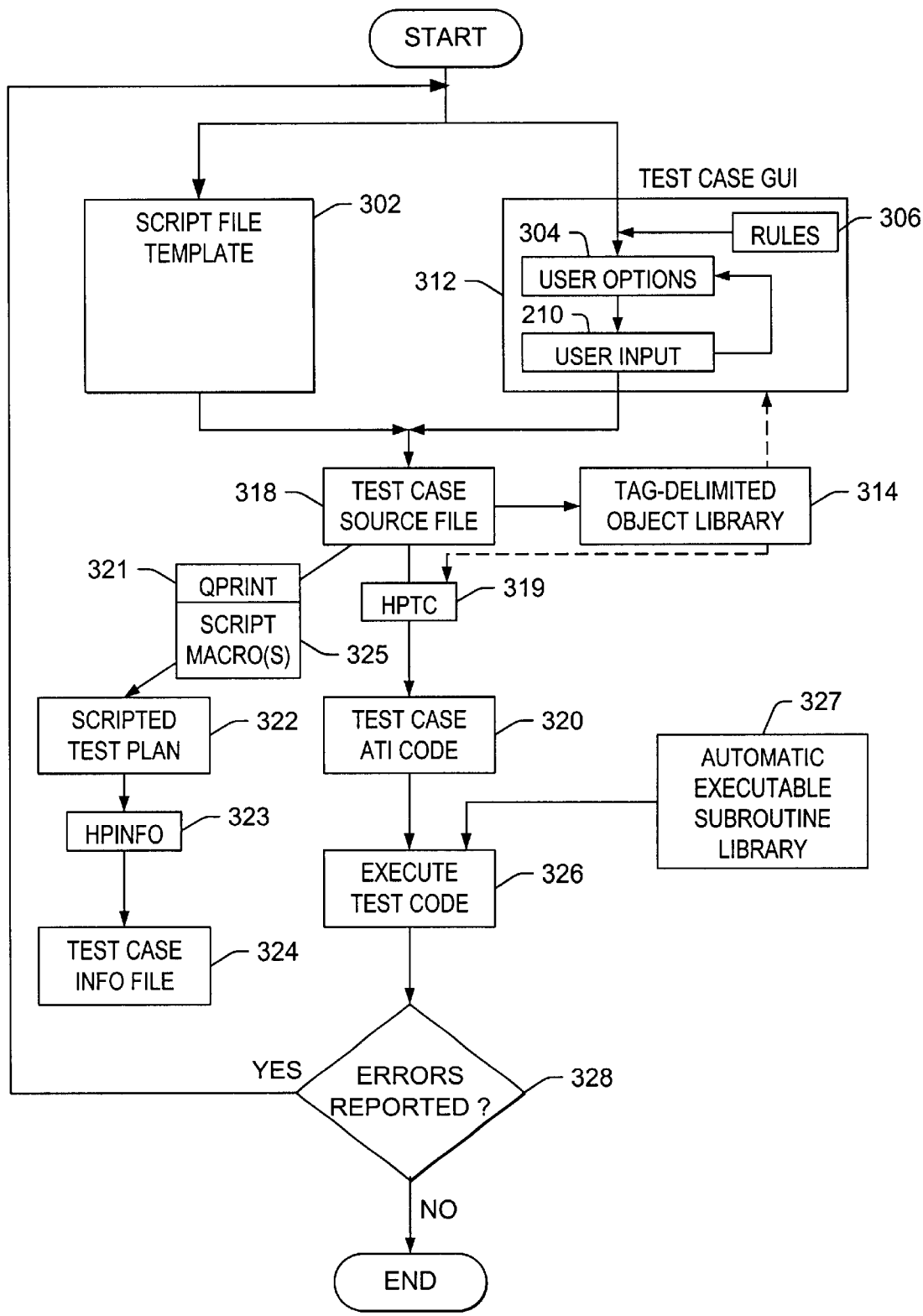
FIG. 3 is a flow diagram providing additional details regarding the operations described in FIG. 2.

FIG. 3 is a flow diagram providing additional detail regarding the operations described in FIG. 2. A source file 318 can be generated with the use of a test case GUI 312, or manually, by using a source file template 302 using any text editor. The process of generating a source file 318 from the source file template 302 is discussed below.

FIG. 4 is a diagram showing an illustrative embodiment of a template 302 for the source file 318. The source file template 302 provides the user with an organized list of the essential parts of the source file 318. The user can use the template 302 to enter the test case objectives, scenario, procedure, system configuration, and the parts used by the test case. After the source file 318 is completed it is used to generate a test plan 322 and test code 320 for the test case.

The template 400 comprises a plurality of tags 402–450 which are used to identify and delineate information entered into the source file 318. Tags 402, 406, 414, 422, 430, and 438 (denoted :h4) are header tags, indicating that the information that follows the tag (the characters 'Objectives', 'Scenario', 'Procedure', 'Verification', 'System Configuration' and 'Parts Used by Test Case') are associated with a fourth header level that will be printed in plaintext in the test plan 322. Tag 404 indicates that the information that follows will be printed as a text paragraph in the test plan 322. Tags 408, 416, and 424 indicate that the following items are part of an ordered list, and will be numbered. Tags 410, 418, 426, and 434 indicate that the information that follows is a line input. Tags 412, 420, 428, and 436 are end of tag indicators. The narrative of the objectives of the test are entered after tag 404. One or more line inputs or instructions are provided beginning at tag 410 to enter the test scenario. Similarly, information regarding the test procedures, verification, system configuration, and the parts used by the test case are entered after tags 416, 424, 432, and 438, respectively.

FIG. 5 is an example of a script file template 500 after the test purpose and the test scenario have been inserted into the source file 318 by the user. A narrative of the purpose of the test is depicted as 502, and the test scenario is specified by the plurality of lines shown as 504.

In addition to the test purpose and scenario, the user must enter a test procedure. This test procedure results in a series instructions to the system elements 132 being tested. The user may enter the test procedure by simply typing characters describing the appropriate system element commands in the script file or by using a test case graphical user interface 312 (GUI) described later in this disclosure. The test case GUI 312 essentially steps the user through the process of defining the test procedure by asking the user to select test options. The test case GUI 312 thus relieves the user of the need to remember the syntax and parameters for a large number of test procedure commands.

FIG. 6 is an example of a source file template 302 after a plurality of test procedure commands 602–616 have been inserted into the source file template 500. Each of the commands is associated with a tag 602A–616A and one or more tag parameters 602B–616B. Each of the tags for the test procedure commands 602A–616A is associated with a member of a library of executable code test objects 314, each of which is capable of performing an assigned function in support of the automated test procedure. For example, the :HPENTRY tag 602A and associated parameter 602B specify the configuration to be tested. The :HPLOAD tag 604A and associated parameters specify that the database under test is the 'DJK' database, which is to be implemented on a share level of three. Other tags 606A–616A and parameters 606B–616B also refer to specific test commands. The source file 318 is completed when all of the desired test procedure commands have been entered. Returning to FIG. 3, the test case source file 318 is now used to generate a test plan 322 via a QPRINT 321 or similar function. The test plan 322 is presents a conversational language description of the test case (including the objectives, scenario, procedures, etc.).

Figure 7:
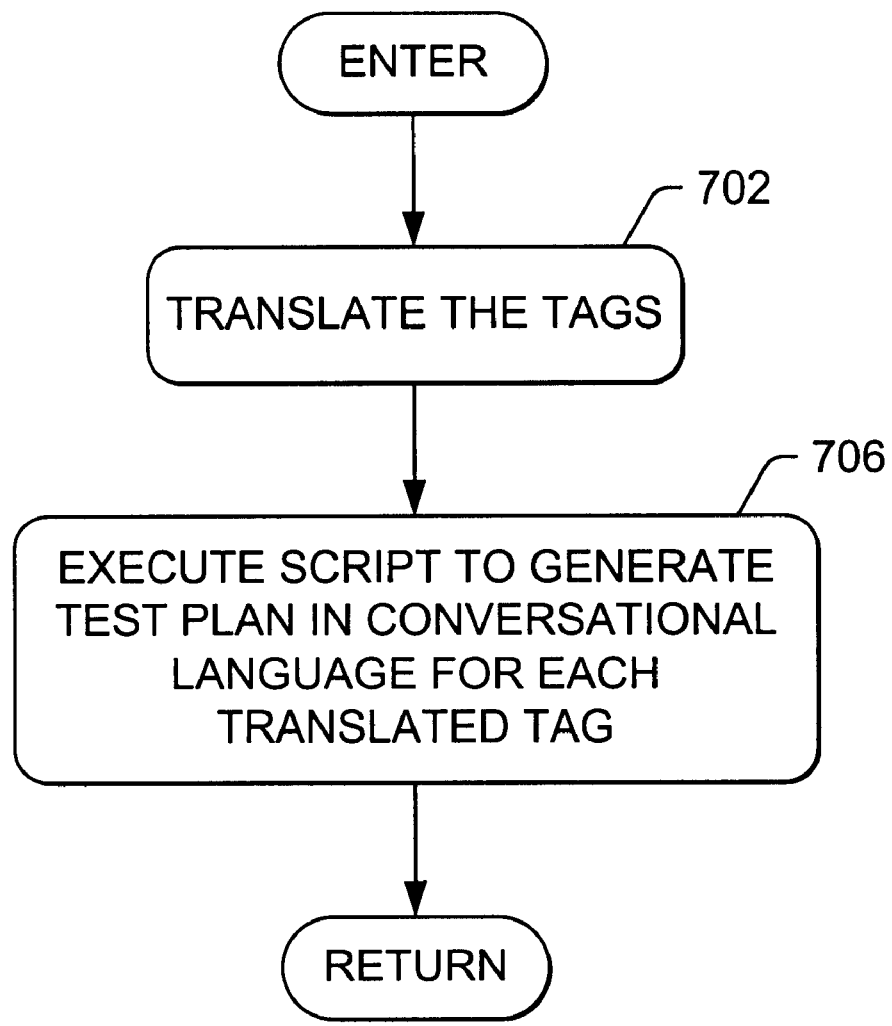
FIG. 7 is a flow chart showing an illustrative example of process steps used to generate the test plan from the source file.

FIG. 7 is a flow chart showing an illustrative example of process steps used to generate the test plan 322 from the source file 318. In some cases, the tags in the source file 318 simply specify a print formatting (e.g. indentation and whether the text following the tag is a header, such as tags 402–450). Other tags, such as tags 602A–616A, are instead associated with the members of the library of executable test code objects 314. The first tag type can be interpreted and printed by a QPRINT function 321. However, the second tag type are not recognized by a QPRINT function 321, and must be identified and handled differently. These tags are interpreted, translated using script macros 325, and conversational language statements in for the test plan 322 are generated as shown in blocks 702 and 704. This is accomplished via script macros 325 such as the script macro having representative code instructions presented in FIGS. 30A and 30B. If tags are encountered that are uninterpretable (because, for instance, the user typed in the incorrect tag name, a tag not associated with one of the script macros 325, or an unsupported or out of range tag parameter), an error message (such as "+++") noting this error is placed in the test plan 322 in the appropriate place.

The tags in the source file 318 are scanned to identify system elements 132 that are tested by the test case, and to generate a test index (the index is automatically generated) from the identified system elements 132. This gives the user an at-a-glance view of the scope and thoroughness of the test case.

FIGS. 8A and 8B are diagrams showing a test plan 322 generated from the source file shown in FIG. 6. Note that the QPRINT function 321 has interpreted the first tags to format the test plan 322 accordingly, and the script macros 325 have interpreted the second tags, and provide a conversational language depiction of the test procedures. Because the test plan 322 represents a conversational language description of what the test hopes to accomplish, what procedures it will use, and the test code, the test plan 322 can be published for review and comment. If any changes to the test are required, the user makes the necessary changes to the source file 318, and generates the test plan 322 anew. The test plan 322, too, can also be used to generate other special purpose files. For example, the test plan 322 can be processed by a HPINFO software module 323 to generate a test case information (info) file 324 that can provide test case background and other information. If necessary, additional software modules can process the source file 318 to generate test specifications and similar documentation.

After the test plan 322 has been approved, the next step is to generate test code 320 from the source file 318. This step is performed by an HPTC EXEC software module 319, which interprets the tags and associated tag parameters in the source file, and generates test code with links to the appropriate member of the library of executable code objects 314. In one embodiment, the generated automated test code 320 uses a screen-scraping technique wherein the commands to the system elements are provided via coded automated keystroke entries which are injected to the appropriate system element. An example of a portion of HPTC EXEC code used to translate a HPSRLM2 test object to test code is presented in FIG. 31. An example of the generated test code 320 translated from the HPSRLM2 test object is shown in FIG. 9E, at 910. An example of the subroutine that the test code line 910 calls is shown in FIGS. 32A–32C. This code resides in the automated executable subroutine library 327. Responsive messages from the system element are intercepted and used to determine whether the command proceeded normally, or if there was an error.

FIGS. 9A–9E are diagrams showing a listing of an automated test code 320 generated from the script file shown in FIG. 6. The listing begins in FIG. 9A with commented code (leading '/*' characters denote code comments) describing the objectives, and scenario for the test case. The listing continues in FIG. 9B with additional information regarding the test case name, the source file, and other information. The remainder of FIG. 9B, as well as FIGS. 9C and 9D describe variable definitions for scenario variables and called commands. FIG. 9E presents the test code commands.

Returning to FIG. 3, once the test code has been generated, it can be executed 326. Using the screen-scraping technique described above, the commands are provided to the system elements 132, and response messages from the system elements 132 are used to determine the test result, and whether the test errors were reported. If no test errors were reported 328, the test results are provided to the user, and the test case has completed. If test errors are reported 328, they may be corrected by altering the test case source file 318, and regenerating the test plan 322 and the automated test code 320. One of the advantages provided by the present invention is the use of the source file 318 to automatically generate both the test plan 322 and the automated test code 320. When errors are detected in either the test plan 322 or the test code 320 (whether by executing the code or compiling the code), those errors can be corrected by making appropriate changes to the source file 318. Hence, the test code 320 is self-documenting, and there is no need for the user to go through the time-consuming (and often omitted) process of rewriting the test plan 322 to conform with actual test procedures.

The foregoing uses a source file having a plurality of tags which are associated with executable code test objects in the executable code test object library 314. Although the user of pre-defined test objects simplifies the generation of the test code 320, the user is still required to have adequate knowledge of the syntax and related parameters of the test procedure commands 602–606. Further, in many cases, the proper value for a particular test command is dependent upon a function and value selected in another portion of the test code. The present invention ameliorates this problem with a test case GUI 312, which operates with the computer GUI 118B. Referring again to FIG. 3, the test case GUI 312 assists the user in generating the source file 318 by presenting test case options 304 to the user, and accepting user input 210 selecting the appropriate options. The user options 304 are determined by one or more of a set of rules 306. User options may also be context-sensitive. That is, the options available to the user to perform a particular test function may be a dynamically determined according to a previously selected user input 210. The test case GUI 312, as described for fully herein, also permits the user to convert manually entered test case commands into test case objects, and to store them in the executable code test object library 314 for future use.

Figure 10:
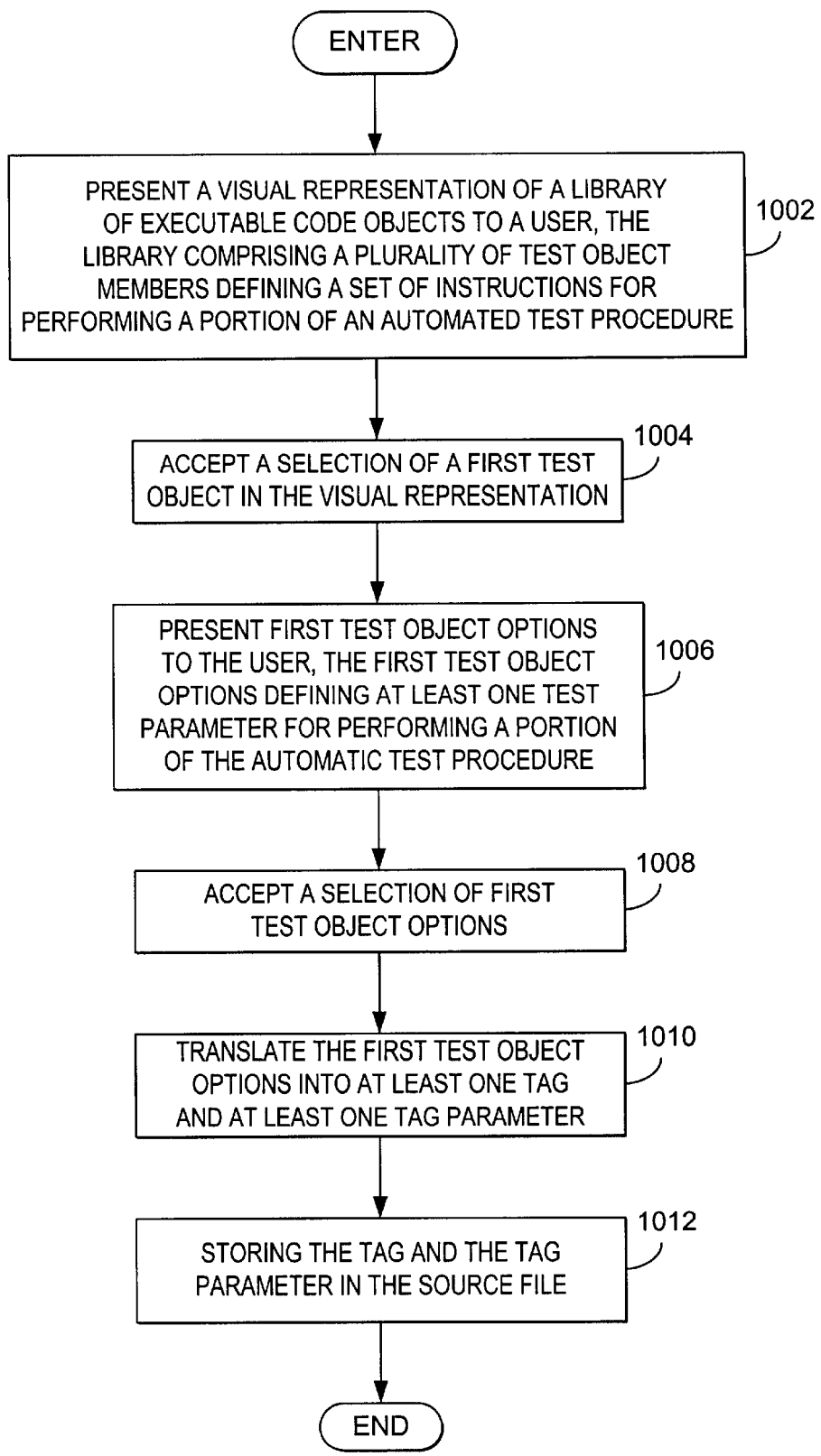
FIG. 10 is a flow chart presenting an overview of the operations used to generate a source file using the test case GUI.

FIG. 10 is a flow chart presenting an overview of the operations used to generate a source file 318 using the test case GUI 312. First, a visual representation of the members of the library of executable code test objects 314 is presented to the user, as shown in block 1002. Then, the test case GUI 312 accepts 1004 a selection of a first test object in the visual representation. Test options for the first test object are then presented 1006 to the user for selection. The test options define test parameters for performing a portion of the automated test procedure. Then, the test case GUI 312 accepts user-selected first test object options, as shown in block 1008. The first test object options are translated into a tag and an associated tag parameter, which will ultimately be stored 1012 in the source file 318.

Figure 11:
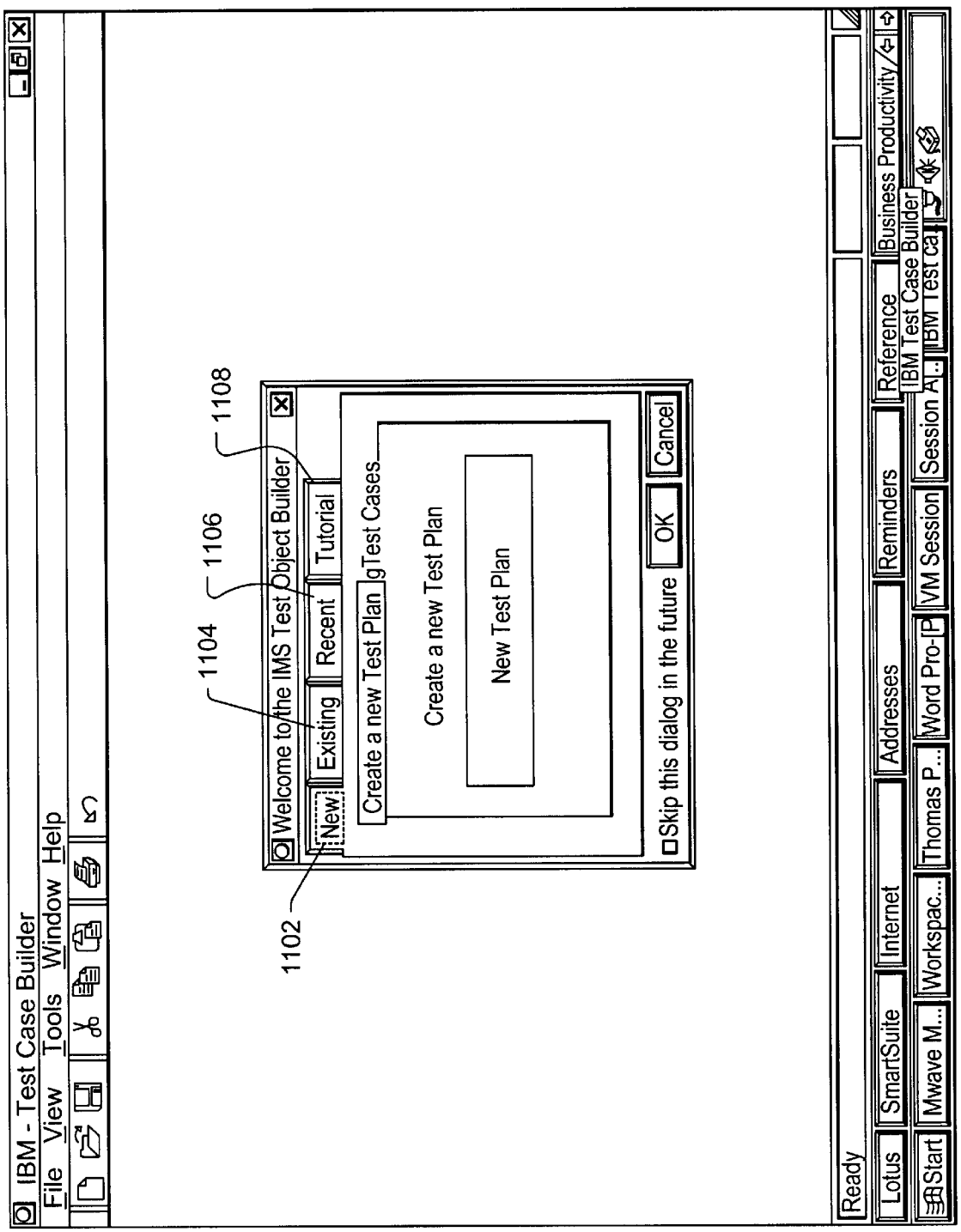
FIG. 11 is a diagram of a start-up window for the test case GUI.

FIG. 11 is a diagram of a start-up window for the test case GUI 312. The start-up window comprises a plurality of tabs 1102, 1104, 1106, and 1108 for navigating the start-up window. The "new" tab 1102 allows the user to create a new test plan, the "existing" tab 1104 allows the user to edit and run an existing test plan or existing test case, the "recent" tab 1106 allows the user to view recently generated test plans or test cases, and the "tutorial" tab 1108 allows the user to participate in a tutorial on how to use the test case builder.

Figure 12:
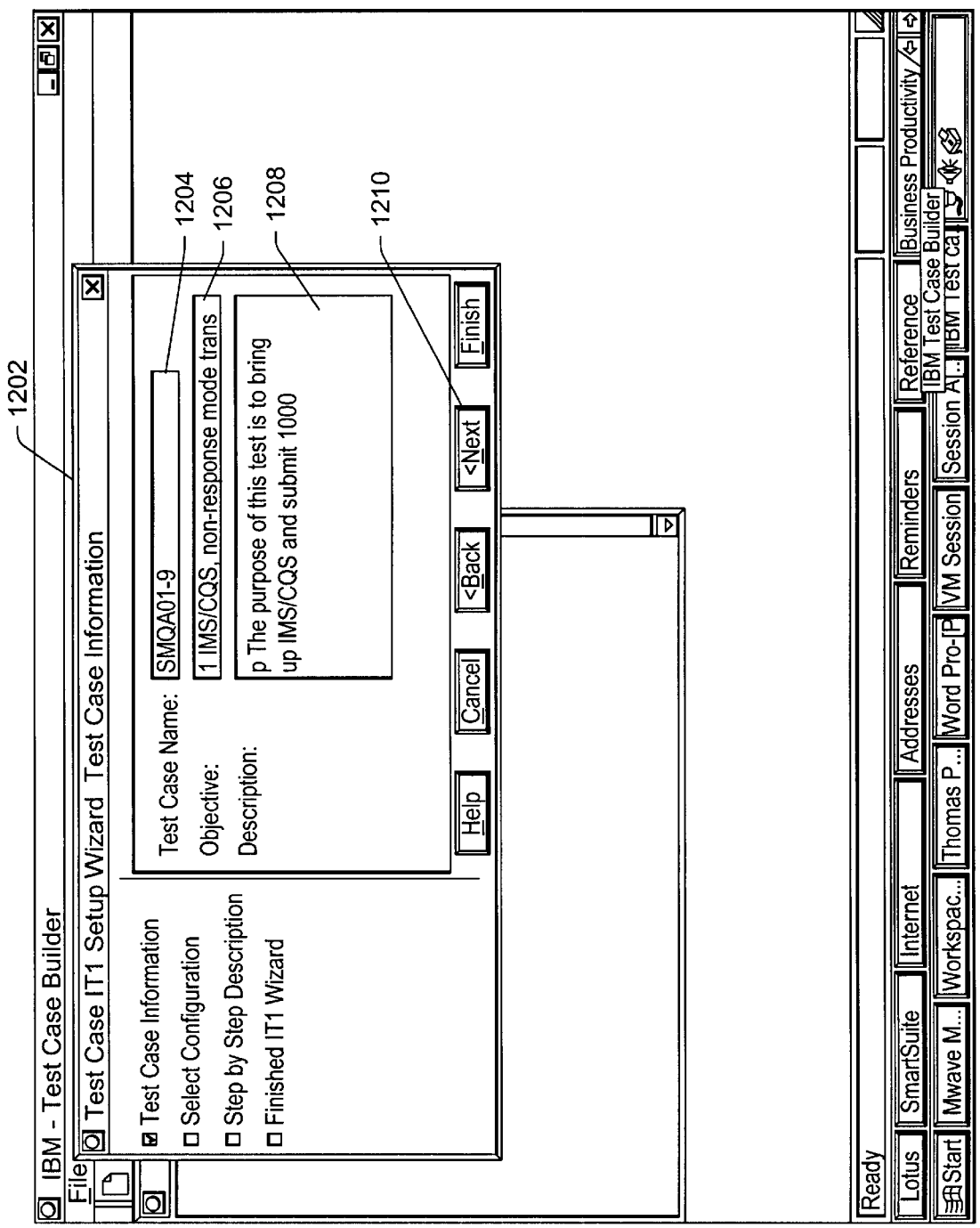
FIG. 12 is a diagram of one embodiment of the appearance of the test case GUI prompting the user to provide a test case name and a test case description.

FIG. 12 is a diagram of one embodiment of the appearance of the test case GUI 312 after the user has elected to create a new test case. The test case GUI 312 now presents a test case information window 1202. The user is prompted to enter the test case name in a test case name field 1204, the objective of the test case in an test objective field 1206, and a description of the test case in a line-wrapped description field 1208. After entering the information, the user selects the "next" button 1210.

Figure 13:
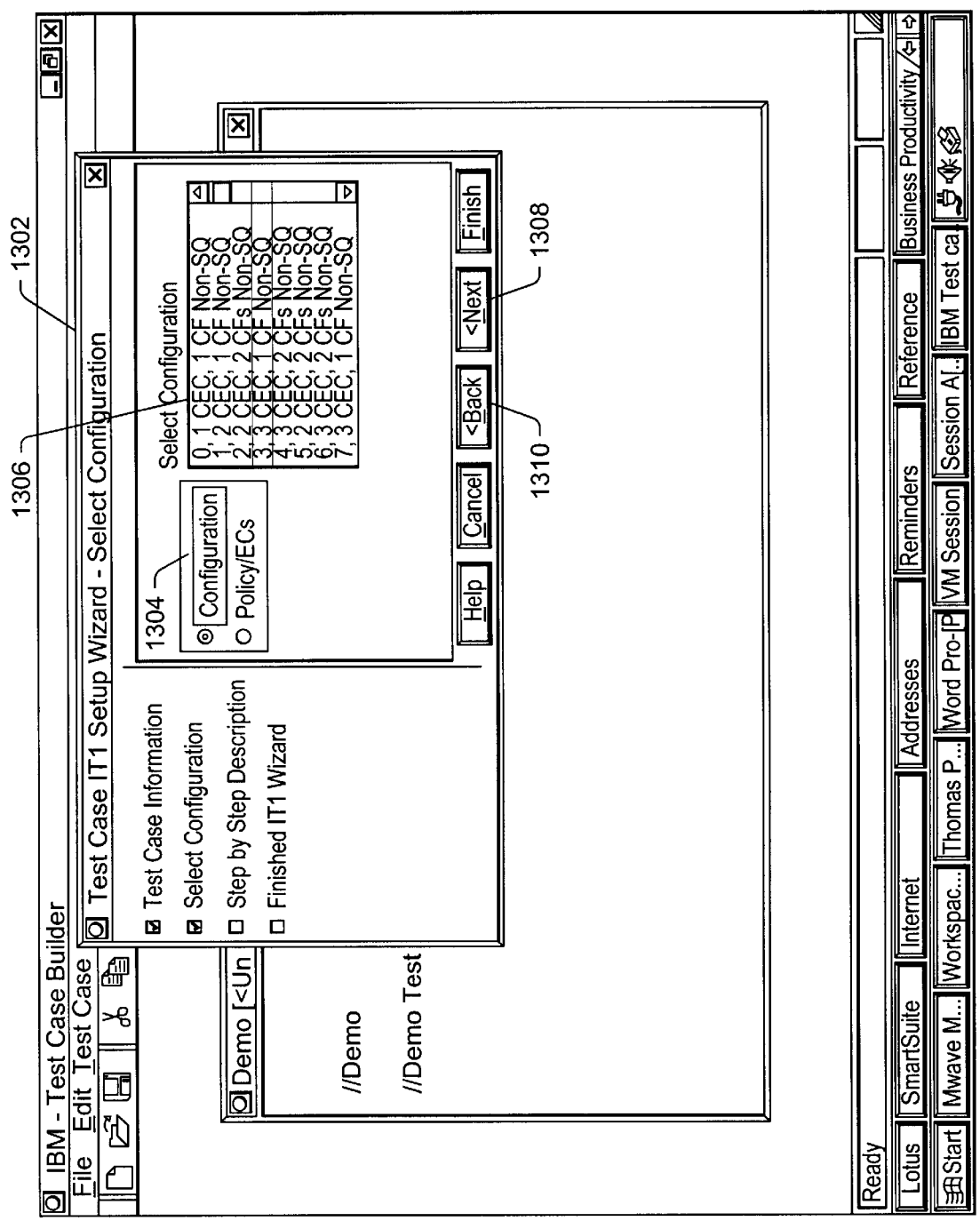
FIG. 13 is a diagram of the appearance of one embodiment of the test case GUI, prompting the user to select a configuration (environment)

FIG. 13 is a diagram of the appearance of one embodiment of the test case GUI 312. Here, the test case GUI is prompting the user to enter the test case configuration with a "select configuration" window 1302. The user selects the desired processor configuration from the options presented in the "select configuration" window 1302. In the illustrated example, the user has selected a three processor configuration. When the user is satisfied with the configuration selection, the "next" button 1308 is selected. If the user would like to change an entry made in a previous window, the "back" button 1310 is selected.

Figure 14:
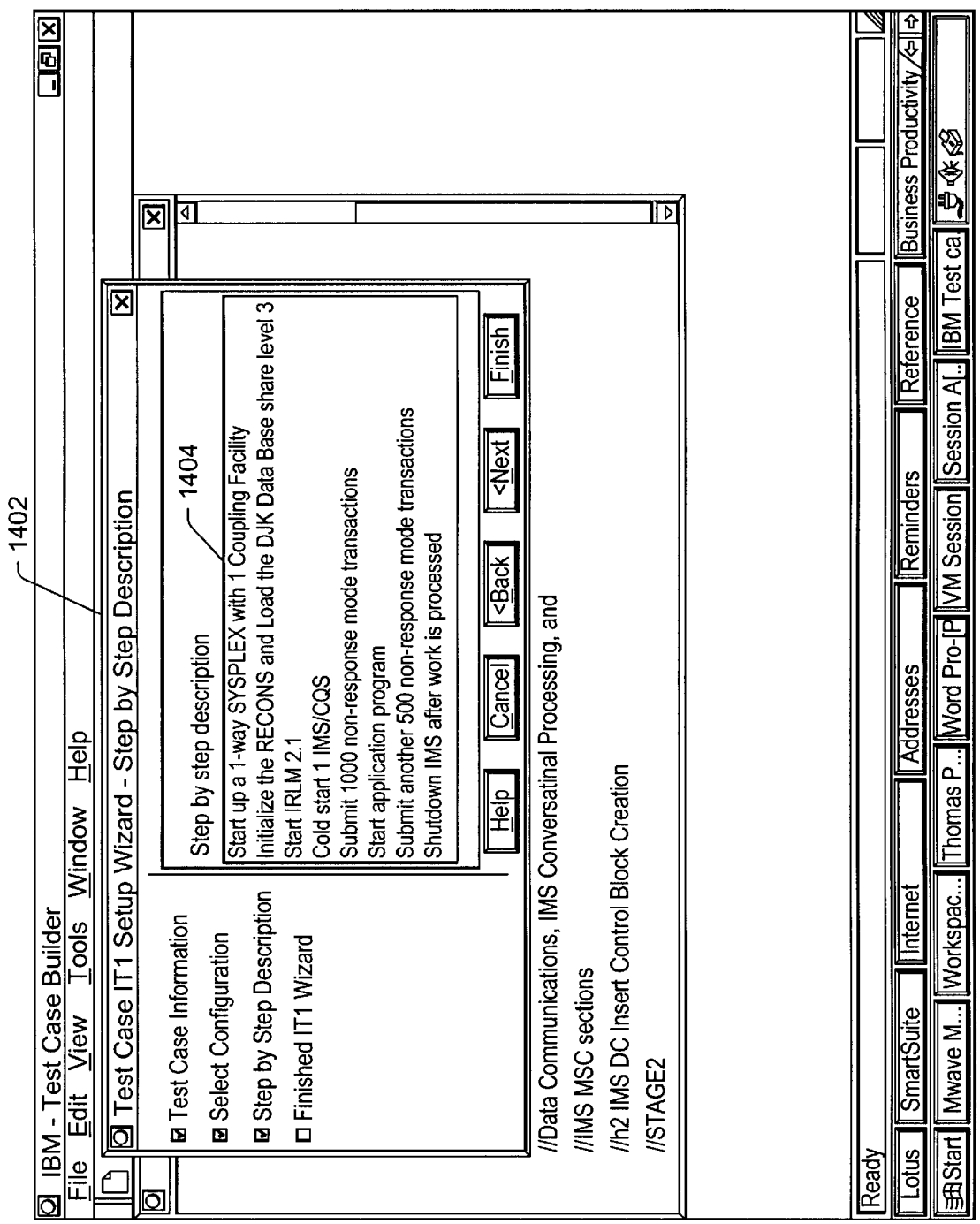
FIG. 14 is a diagram showing an exemplary example of the test case GUI prompting the user to enter a step-by-step scenario description.

FIG. 14 is a diagram showing an exemplary example of the test case GUI 312 prompting the user to enter a step-by-step scenario description. This is accomplished by presenting a "step-by-step" scenario description window 1402. The user enters a conversational language description of the scenario for the test case in the description field 1404. When completed, the user selects the "next" or "back" buttons, as described above. The foregoing operations complete the first phase of generating a the source file.

Figure 15:
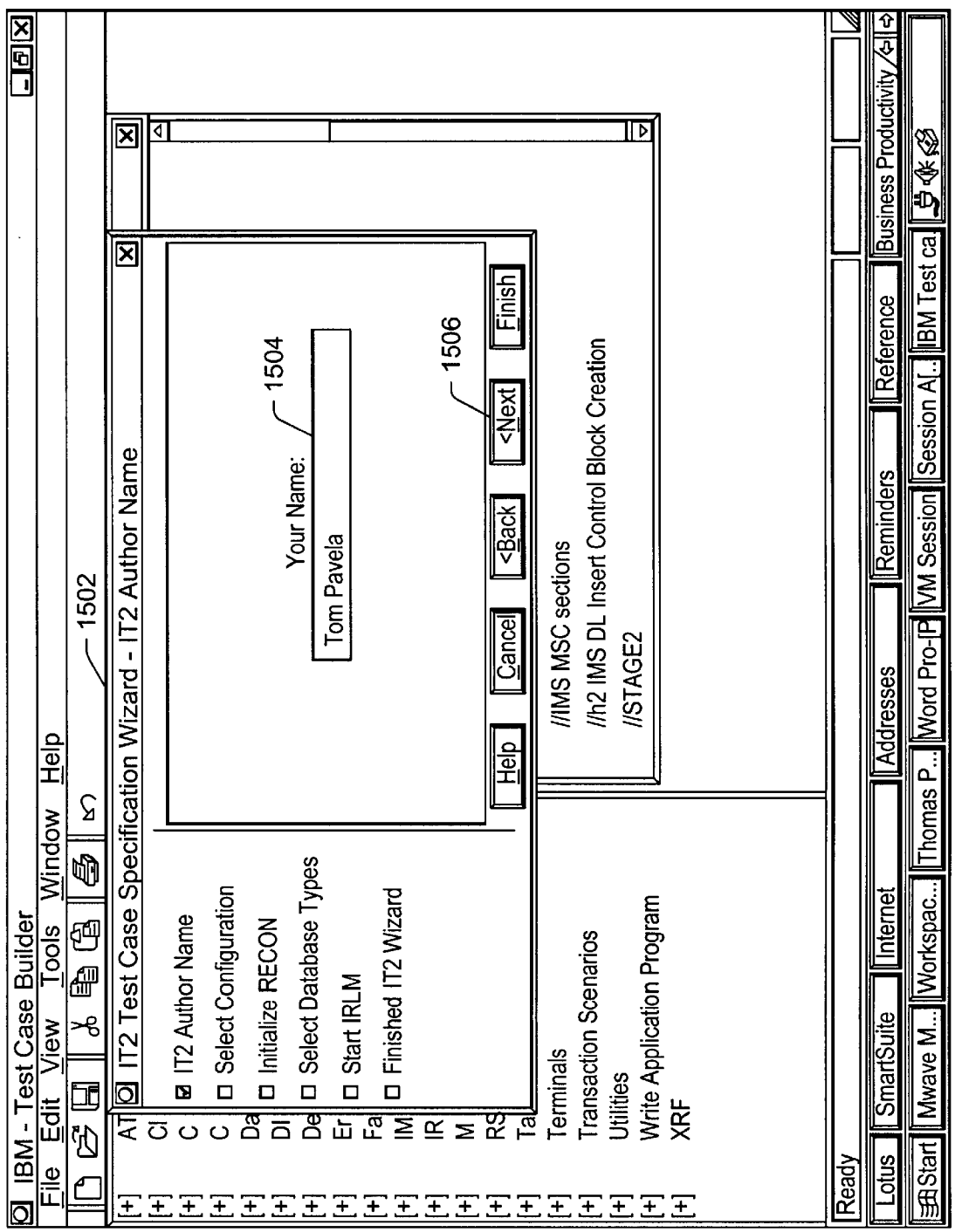
FIG. 15 is a diagram showing an example of how the test case GUI prompts the test designer to enter an author name.

FIG. 15 is a diagram showing an example of how the test case GUI 312 prompts the test designer to enter an author name. A author field 1504 is provided in an "author name"

window 1502. The test designer enters their name in the author name field 1502, and selects the "next" button 1506.

Figure 16:
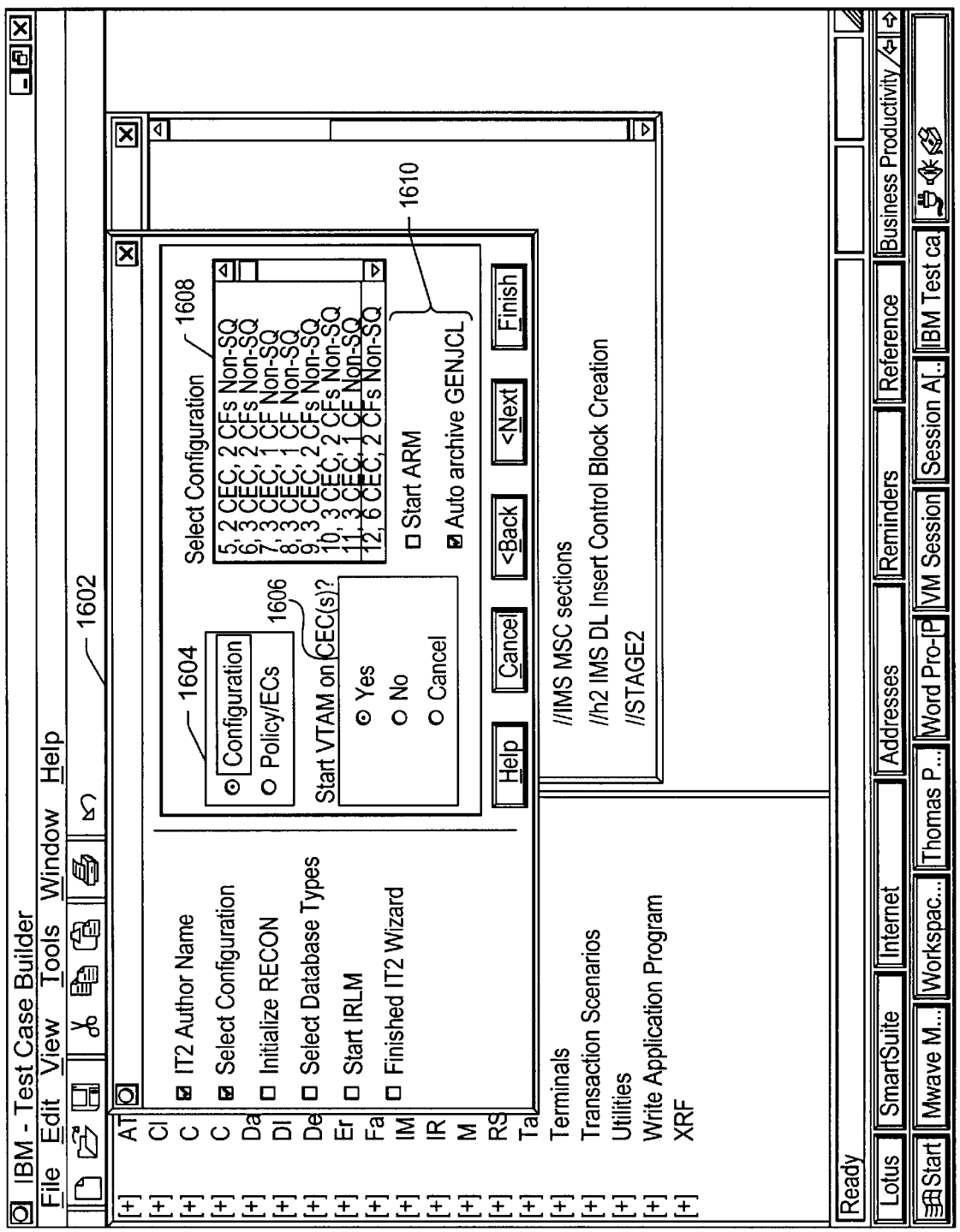
FIG. 16 is a diagram showing an exemplary test case GUI prompting the user to select a test configuration.

FIG. 16 is a diagram showing an exemplary test case GUI 312 prompting the user to select a test configuration. A "select configuration" 1602 window is presented to the user. The "select configuration" window 1602 comprises one or more data entry or option selection areas 1604–1610 to select from the available configuration options. In the illustrated example the user has selected a six computer configuration.

Figure 17:
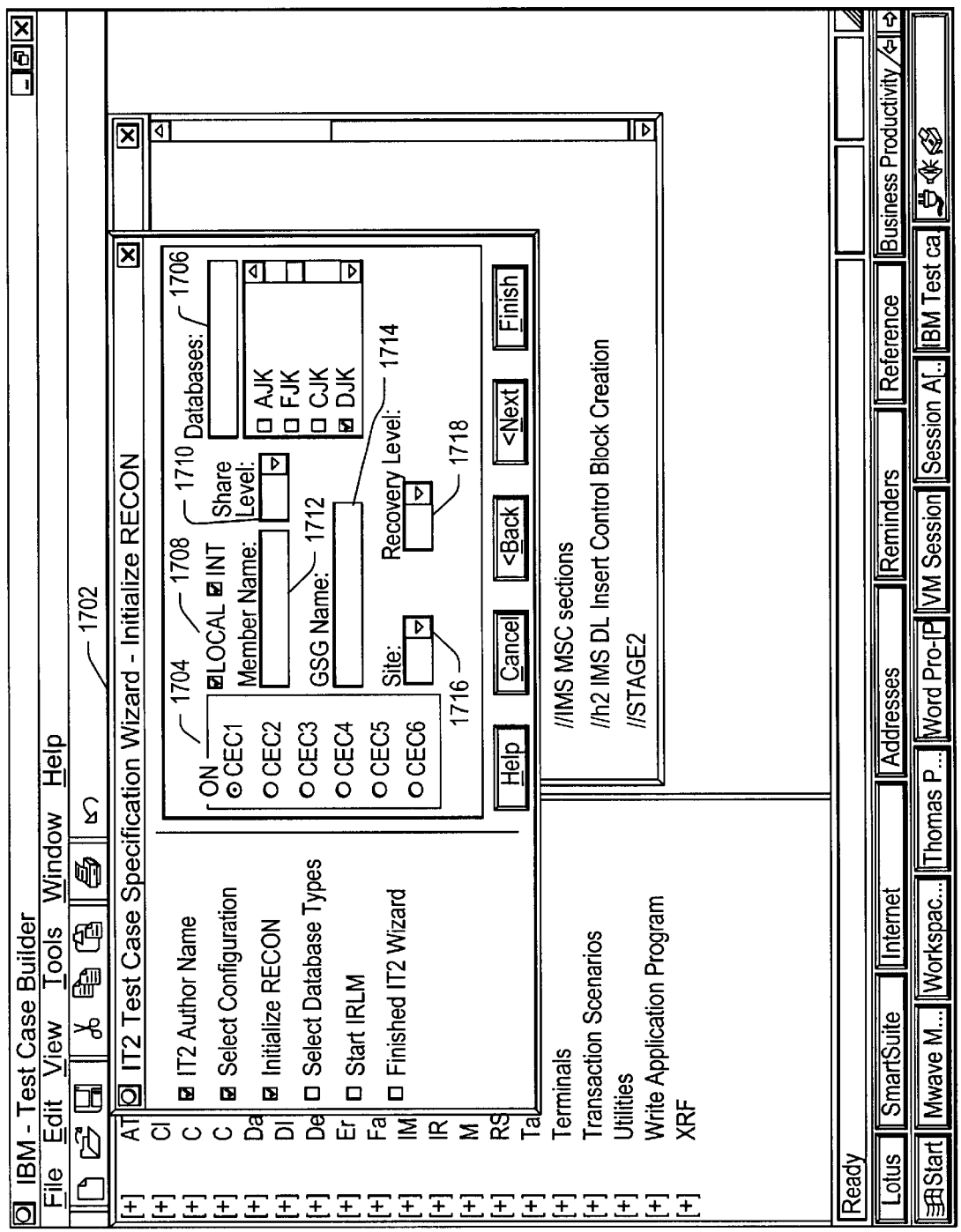
FIG. 17 is a diagram showing an exemplary test case GUI prompting the user to select among RECON initialization options.

FIG. 17 is a diagram showing an exemplary test case GUI 312 prompting the user to select among RECON initialization options. Here, the test case GUI 312 comprises a "initialize RECON" window 1702, comprising a plurality of data entry or option selection controls 1704–1718. Since the user had previously selected a six computer configuration, computers one through six are listed in the radio button array 1704. The user can select the options for the computer they want to execute the object on by selecting the appropriate radio button from the array 1704, then entering or selecting the appropriate data for the remaining data entry components 1706–1718.

Figure 18:
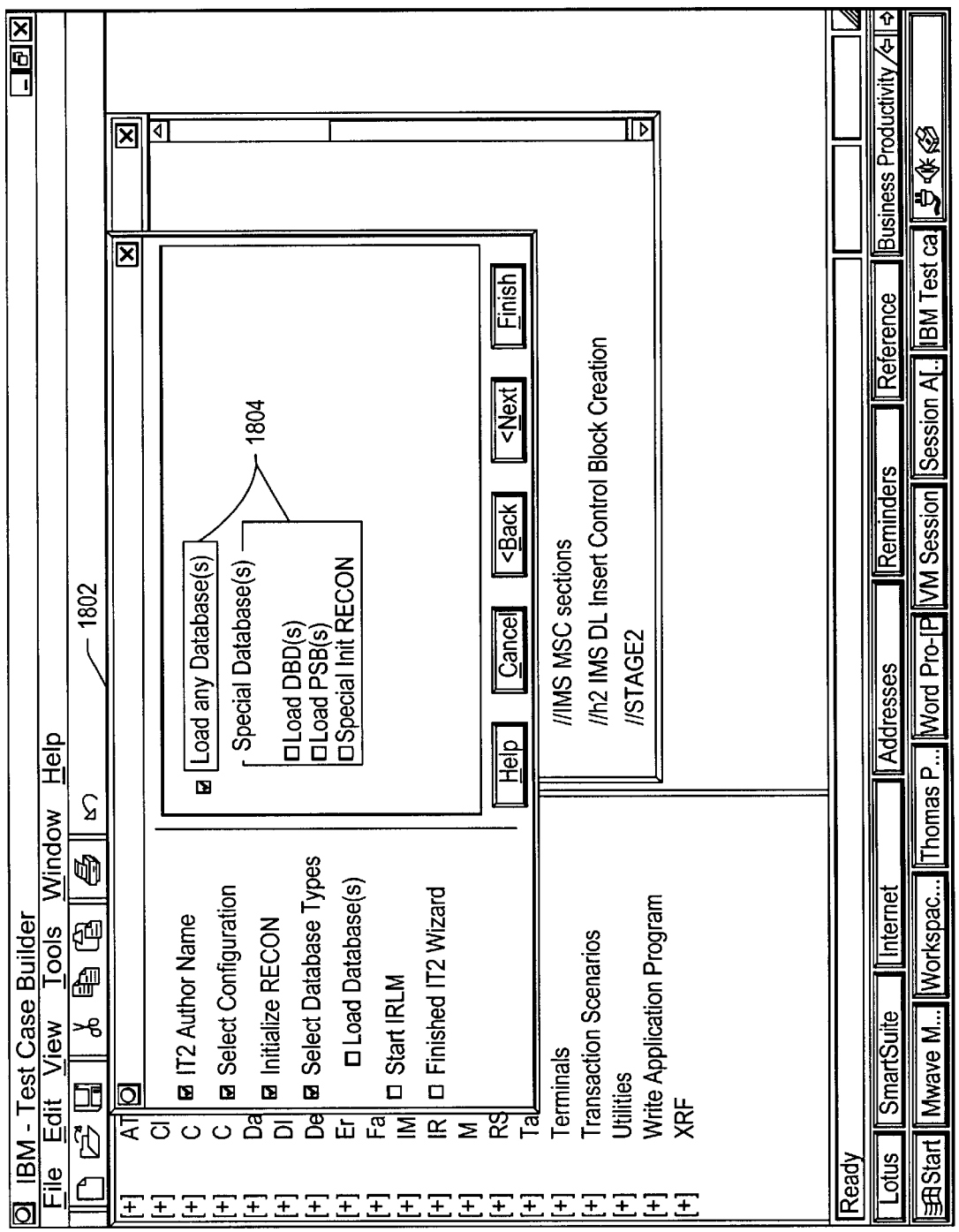
FIG. 18 is a diagram showing an exemplary test case GUI prompting the user to select database types for the test case.

FIG. 18 is a diagram showing an exemplary test case GUI 312 prompting the user to select database types for the test case. Here, the GUI 312 includes a "select database types" window 1802, and input controls 1804 allowing the user to select the database type for the test case.

Figure 19:
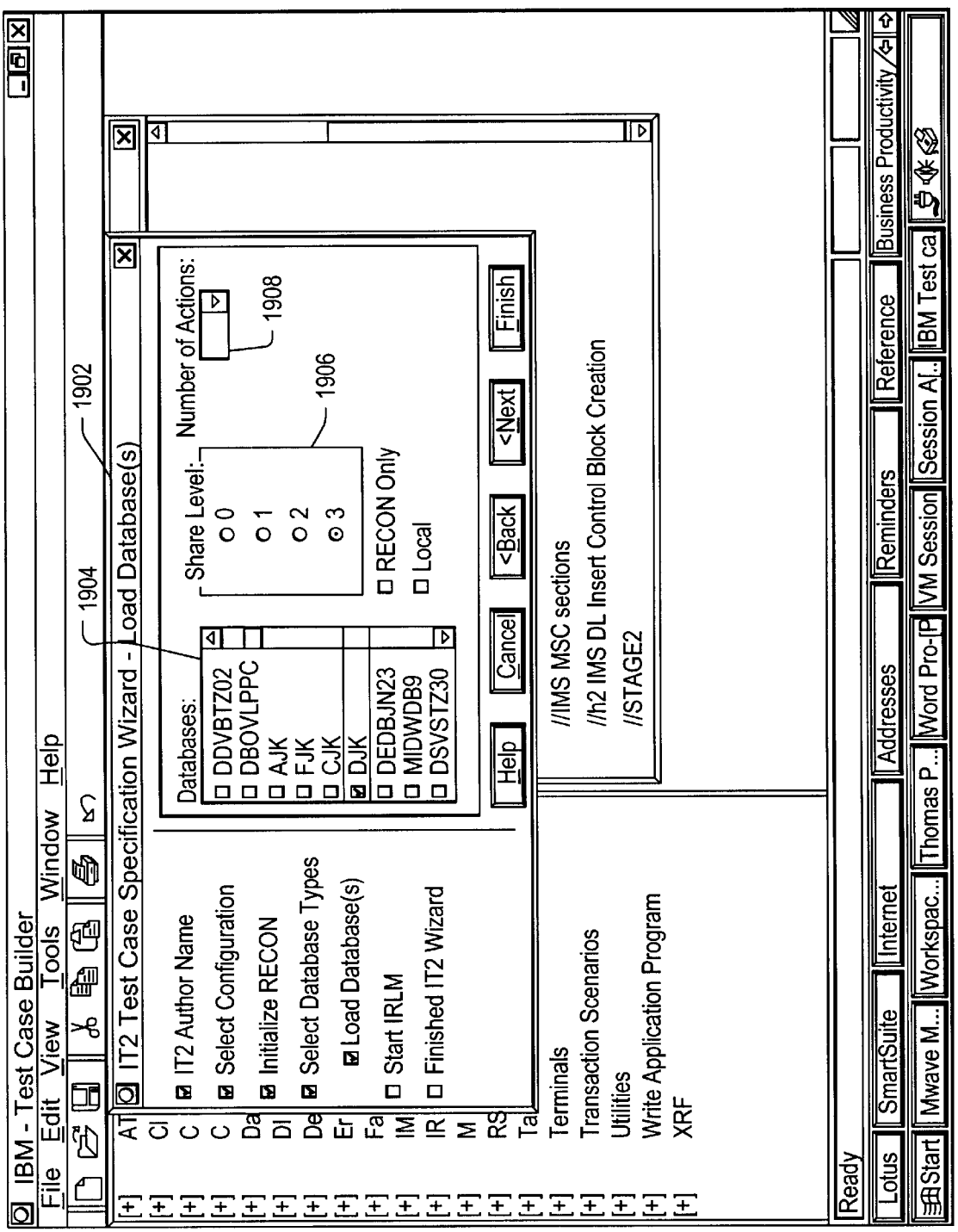
FIG. 19 is a diagram showing an exemplary test case GUI prompting the user to select which databases to load for the test case.

FIG. 19 is a diagram showing an exemplary test case GUI 312 prompting the user to select which databases to load for the test case. The user is presented with a "load database(s)" window 1902 comprising a selectable database list 1904, share level selection radio buttons 1906, and a drop box 1908 to specify the number of partitions for the selected database. The databases listed in the database list 1904 depend on the user's database type selection entered in the test case GUI 312 depicted in FIG. 18.

Figure 20:
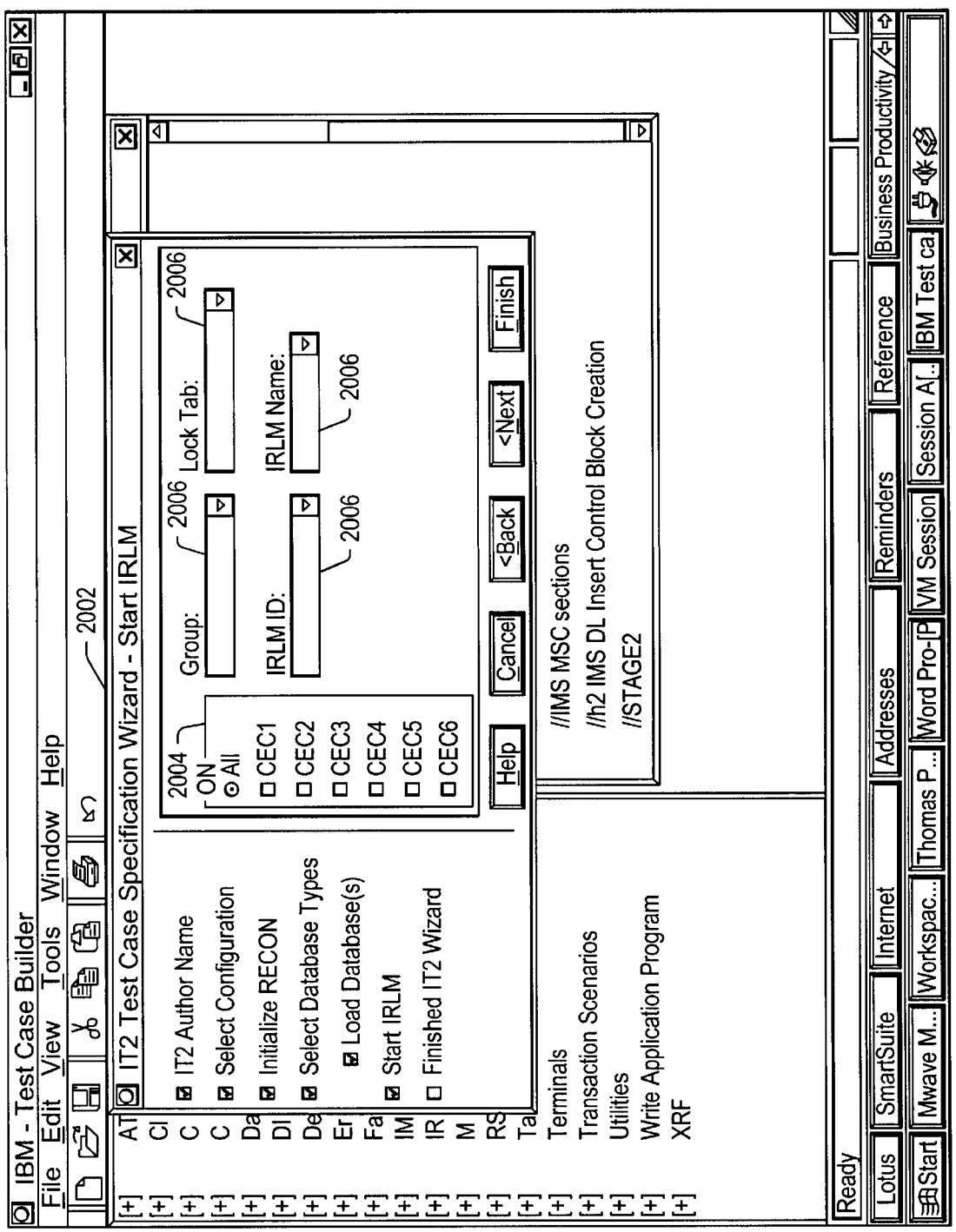
FIG. 20 is a diagram showing an exemplary test case GUI prompting the user to select among IRLM options.

FIG. 20 is a diagram showing an exemplary test case GUI 312 prompting the user to select among IRLM options. The user is presented with a "Start IRLM" window 2002. The user can choose to start the IRLM on all of the computer configurations (CECs) or a group of computers that were specified in the "select configuration" window 1602, in which case the user may not specify any options, or can apply the IRLM options to an individual CEC as desired by selecting appropriate input areas. IRLM options such as the group, lock tab, IRLM ID, and IRLM name are selected with input components 2006. Once the user has completed entering the IRLM options, the user has completed the second phase of generating the test plan is complete.

Figure 21:
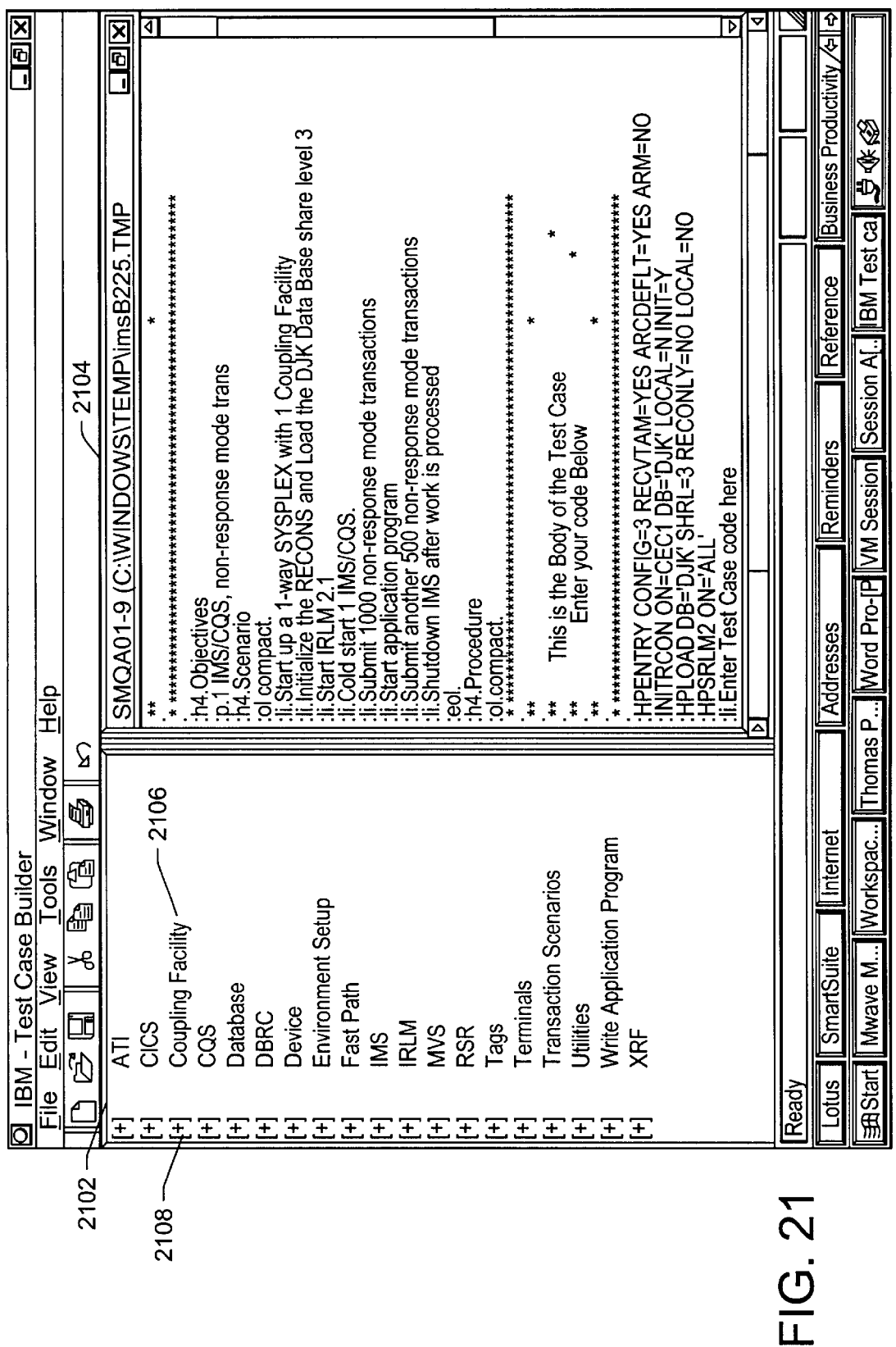
FIG. 21 is a diagram showing an exemplary test case GUI prompting the user to enter test procedure commands.

FIG. 21 is a diagram showing an exemplary test case GUI 312 prompting the user to enter test procedure commands. The test case GUI 312 comprises a first window portion (or object toolbox) 2102 comprising a visual representation of the members of the executable code test object library 314 that can be used to create the source file 318, and a second window portion (or test case window) 2104 which provides a listing of the current source file 318. The member objects in the executable code test library are organized into alphabetized categories. The contents of each category can be examined by selecting the "+" icon 2108 adjacent the category of interest.

Figure 22:
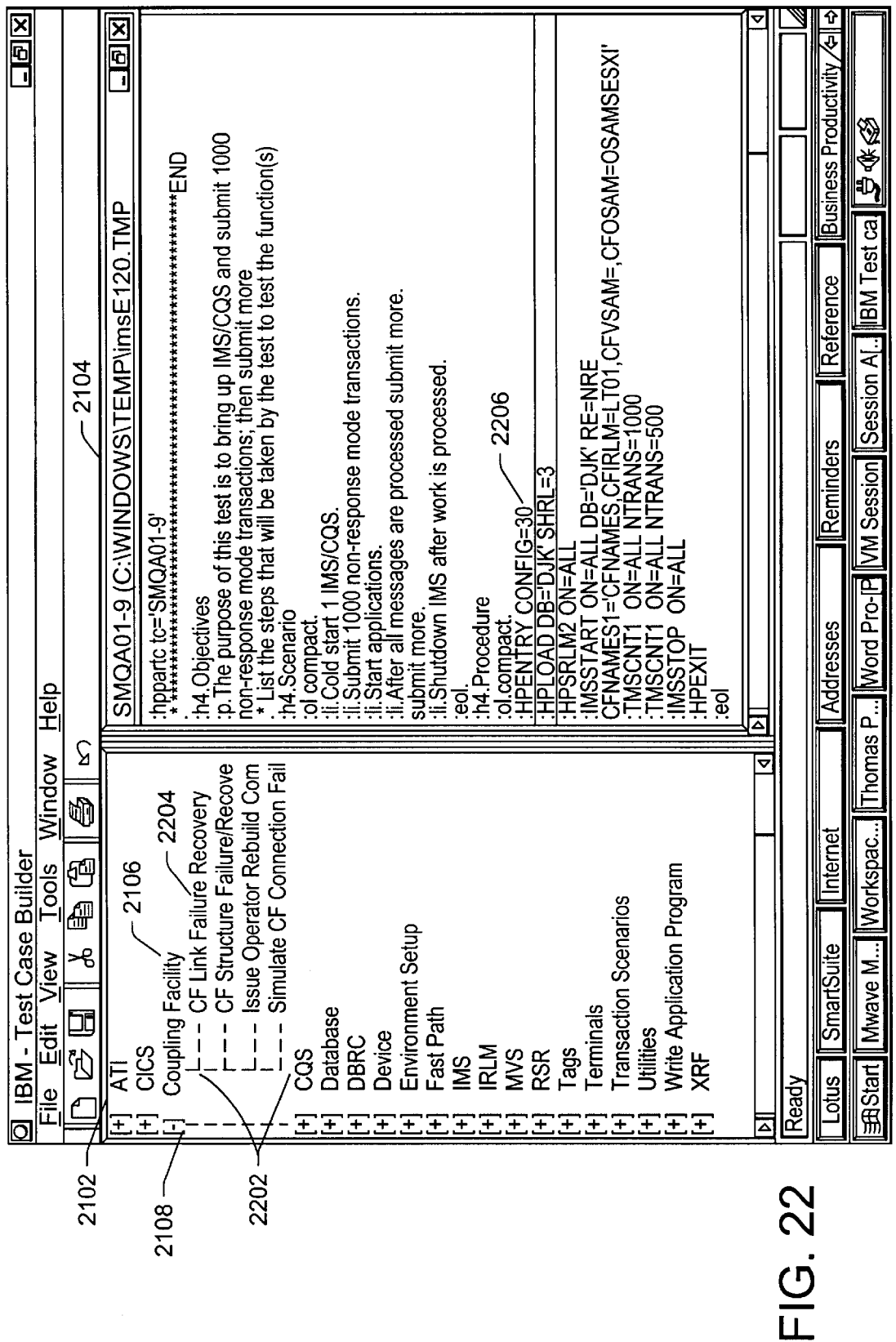
FIG. 22 is a diagram showing the test case GUI after the user has selected an icon to show the library member objects categorized under the coupling facility category.

FIG. 22 is a diagram showing the test case GUI 312 after the user has selected the "+" icon 2108 to show the library member objects 2202 categorized under the coupling facility category 2106, The highlighted area indicates the current line, and new objects added to the test case are inserted after the current line. When the user selects any of the library member objects 2202, a window is opened to present parameter options for that library member object.

Figure 23:
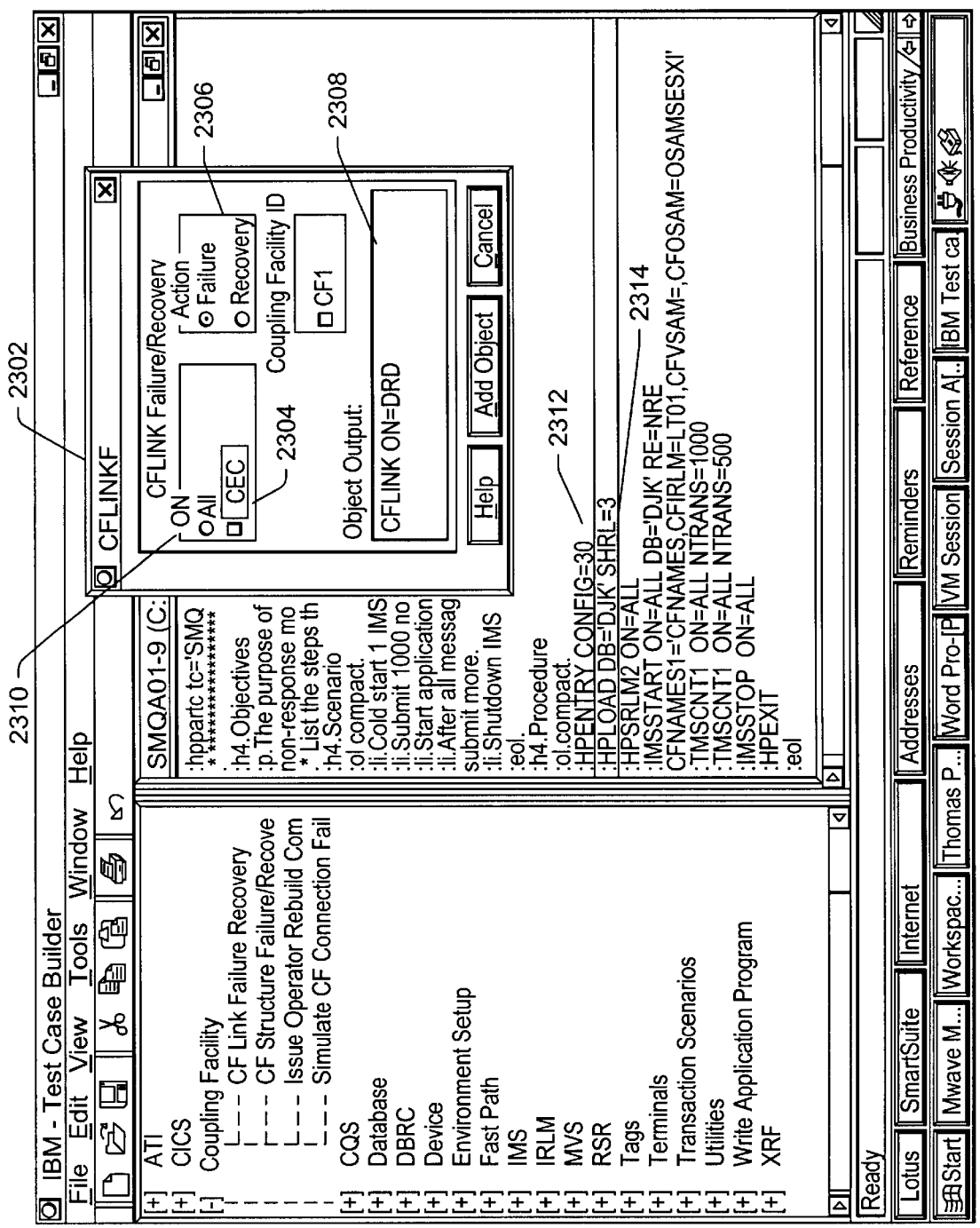
FIG. 23 is a diagram showing the test case GUI after the user has selected the "CF Link Failure Recovery" library member object in FIG. 22.

FIG. 23 is a diagram showing the test case GUI 312 after the user has selected the "CF Link Failure Recovery" library member object 2204 in FIG. 22. Here, a CFLINK window 2302 is displayed, presenting the user with the parameter options for CF Link Failure/Recovery. The CFLINK window 2302 includes an ON frame 2310 having input controls to select the configuration 2304, and an action frame 2306 having input controls to select whether failure or recover action should be taken. Note that since the HPENTRY is set to CONFIG=30, a single computer configuration has been selected, and only one CEC is displayed in the ON frame 2310. The object output text box 2308 shows the syntactical object and its parameter(s) that will be inserted into the test source 2104 after the highlighted line 2314

Figure 24:
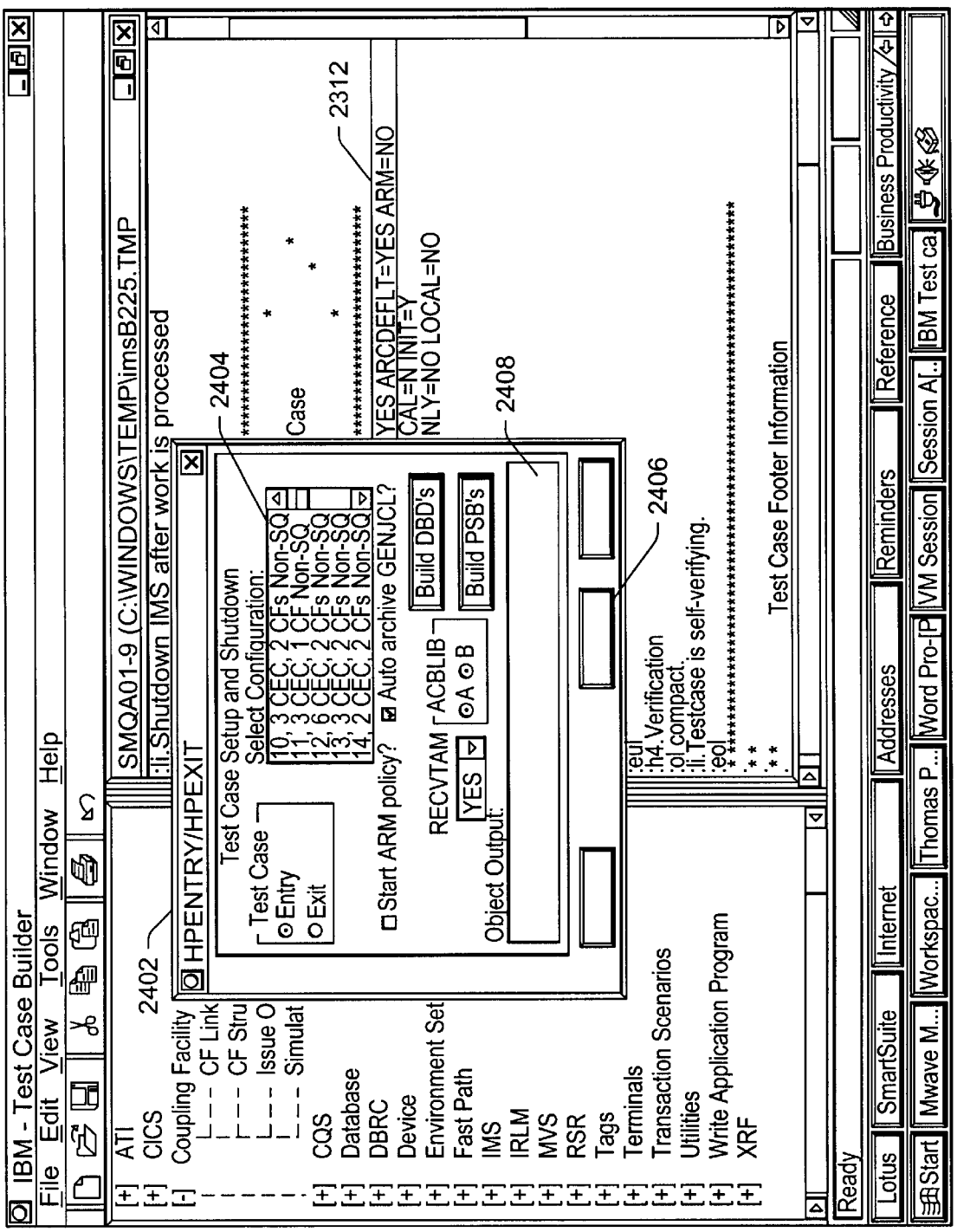
FIG. 24 is a diagram showing how the test case GUI can be used to reverse-parse commands in the source file.

FIG. 24 is a diagram showing how the test case GUT 312 can be used to reverse-parse commands in the source file 318. Here, the user has selected the HPENTRY line 2206 by double clicking in the second window portion 2104 at the HPENTRY line 2206, opening HPENTRY object definition window 2402. The user can now change the HPENTRY test object parameters using the input controls provided. In the illustrated example, the user has selected a six-processor configuration (HPENTRY=12) in the select configuration input control 2404. These settings are accepted when the user selects the "add object" button 2406, and the HPENTRY line 2206 ill be changed in the second window portion 2104 according to the object output 2408 being displayed.

Figure 25:
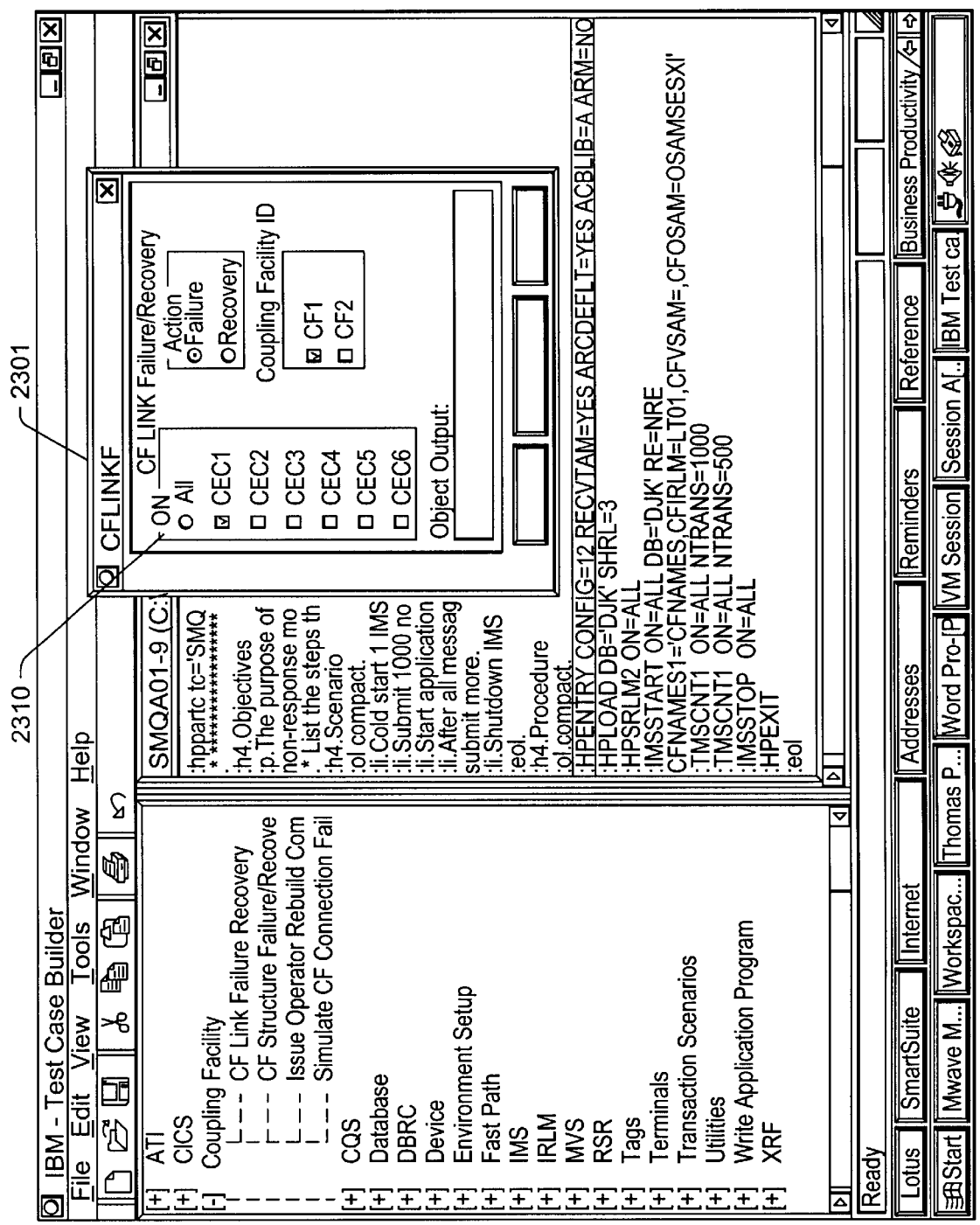
FIG. 25 is a diagram showing the test case GUI after a change in the configuration from a one-way configuration to a six-way configuration.

FIG. 25 is a diagram showing the result of the reverse-parsing performed as illustrated in FIG. 24. Note that when the user selects the "CF Link Failure/Recovery" library member object 2204, the CFLINK window 2302 ON frame 2310 now identifies six processors in the configuration. Using the reverse parsing capability defined above, the user can directly edit the source file 318. The test case GlUI 312 will reverse-parse the selected lines and present the available options to the user, to prevent erroneous input. The user can edit the source file 318 by selecting the edit object on the task bar and clicking on the edit mode.

Figure 26:
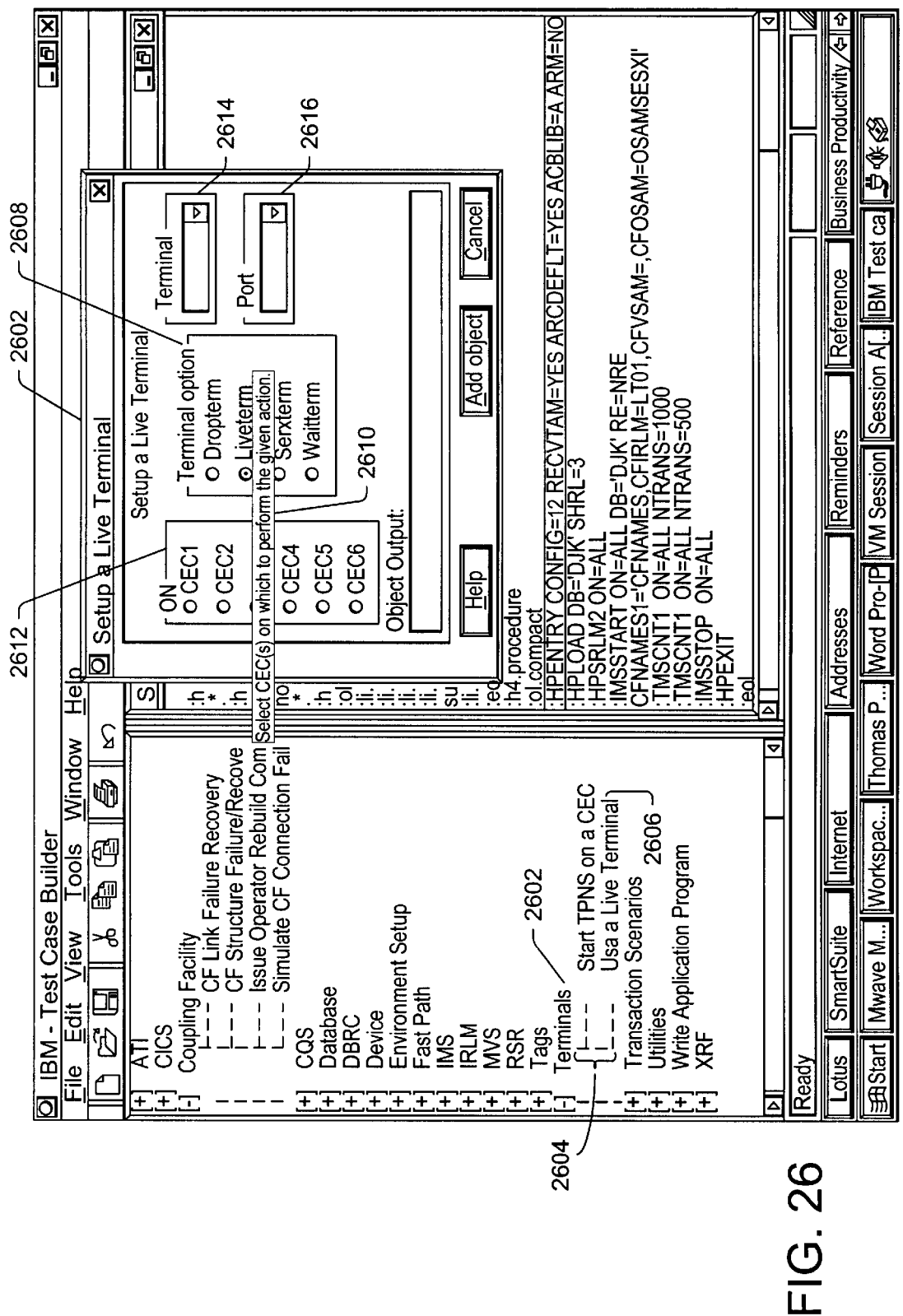
FIG. 26 is a diagram showing another embodiment of the test case GUI.

FIG. 26 is a diagram showing another embodiment of the test case GUI 312. Here, the user has selected the terminals category 2602, showing library member objects 2604 including a "use a live terminal" library member object 2606, and has further selected the "use a live terminal" library member object 2606, thus opening a "Setup a live terminal" window 2606. The "Setup a live terminal window 2606 presents an ON frame 2612, terminal option frame 2608, a terminal frame 2614 and a port frame 2616. The required input parameters for the live terminal library member object 2606 are highlighted by changing the color of the frame or the text labeling the frame. If the user enters a value in the combo box in the terminal option frame 2608, that value is saved for the duration of the test case development session. Tooltip box 2610 is applied to the ON frame 2612 to provide the user with context sensitive help.

Figure 27:
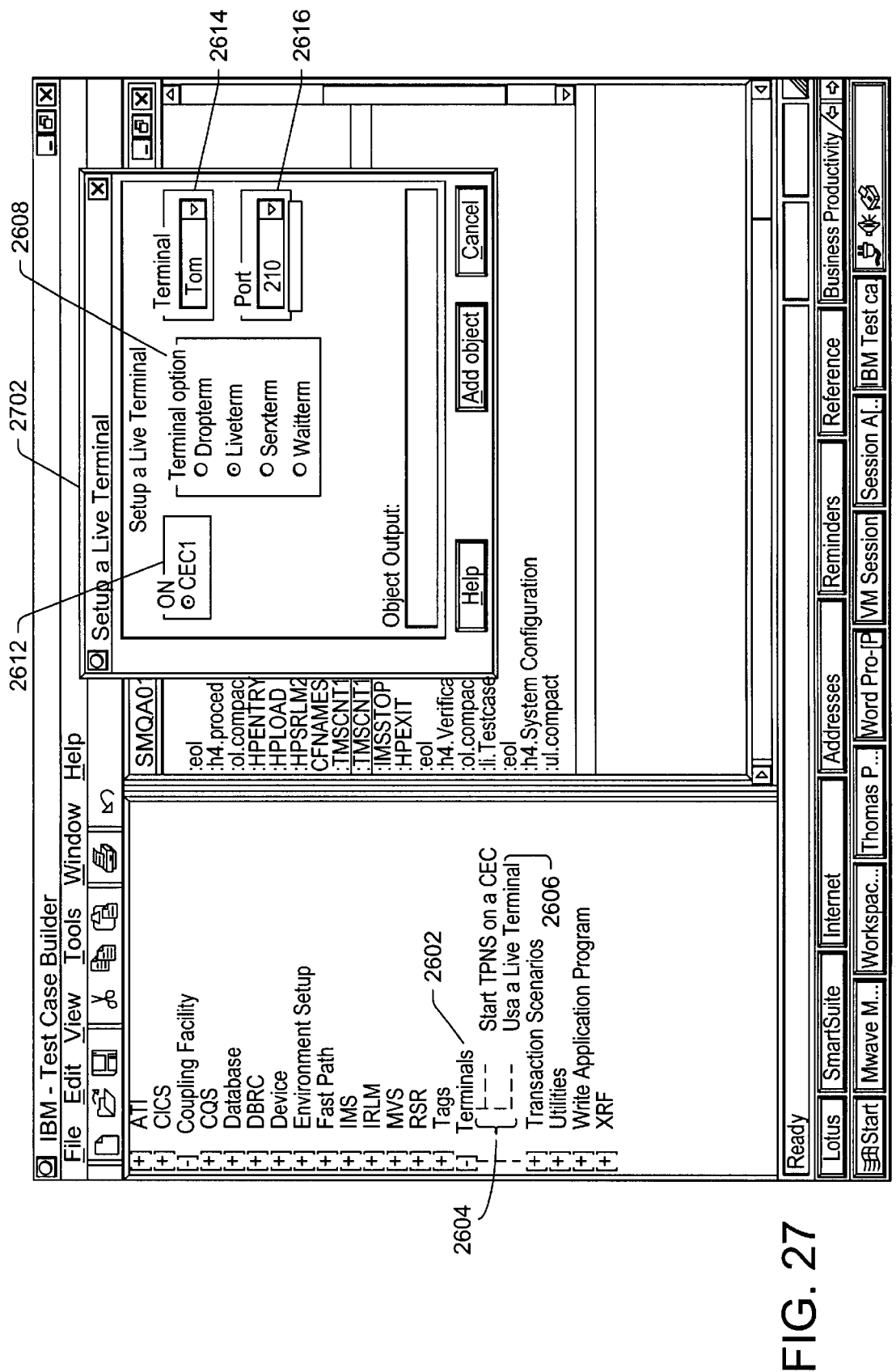
FIG. 27 is a diagram showing the test case GUI showing another embodiment of the "Set up a live terminal" window.

FIG. 27 is a diagram showing the test case GUI 312 showing another embodiment of the "Set up a live terminal" window 2702. Here, the user has specified a single processor configuration, so the ON frame 2612 presents the option of only a single processor configuration. The window 2702 also shows that the user has entered data into the combo box in the terminal frame 2614 and into the combo box in the port frame 2616.

Figure 28:
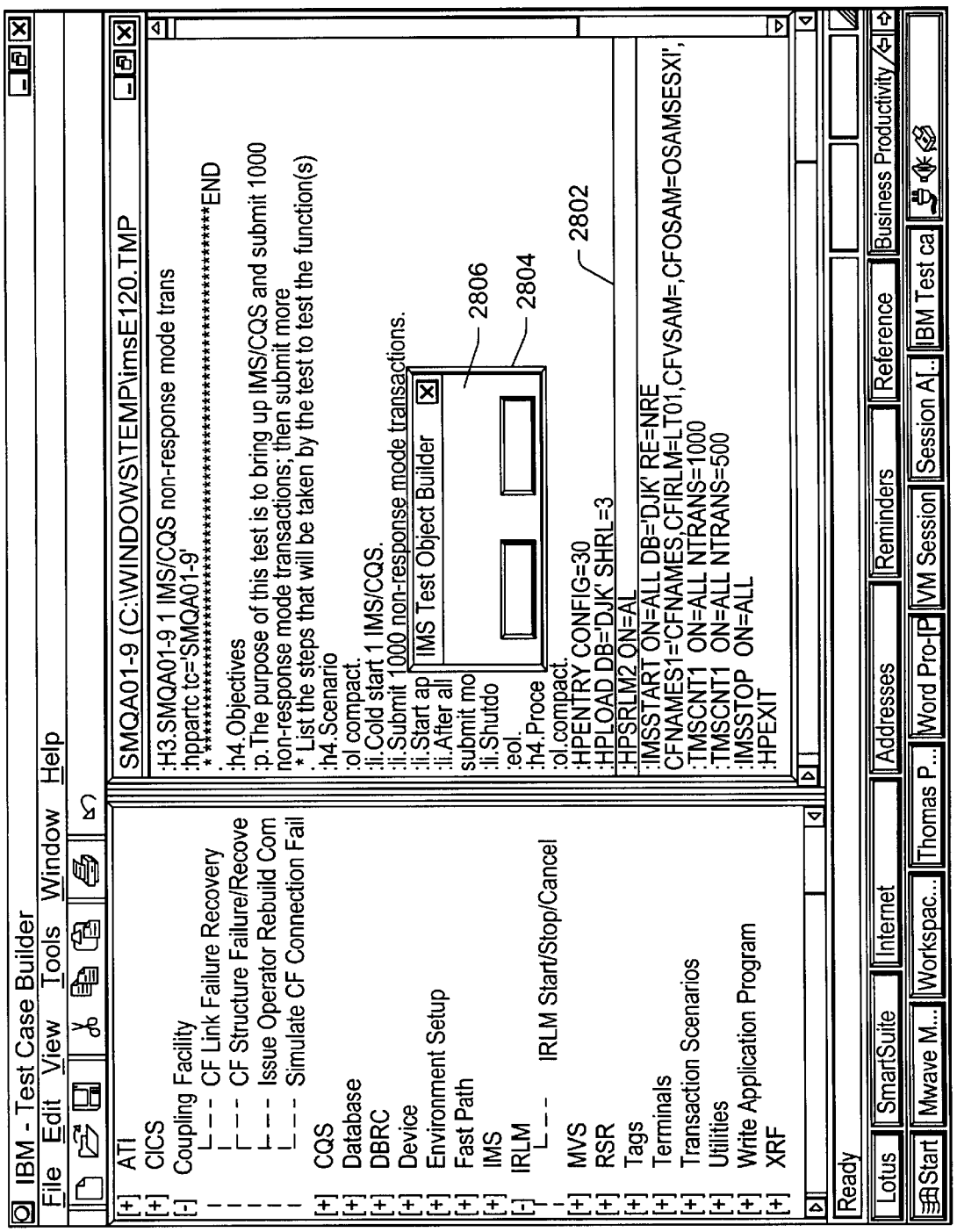
FIG. 28 is a diagram showing the test case GUI after the user has selected an object in the source code having a parameter error for reverse parsing.

FIG. 28 is a diagram showing the test case GUI 312 after the user has selected an object in the source code 318 for reverse parsing. Here, the IRLM object selected by the highlight bar 2802 includes an invalid parameter (ON=AL), and the test case GUI 312 responds by presenting a pop-up window 2804 with an error message 2806 describing the error, and offering help.

Figure 29:
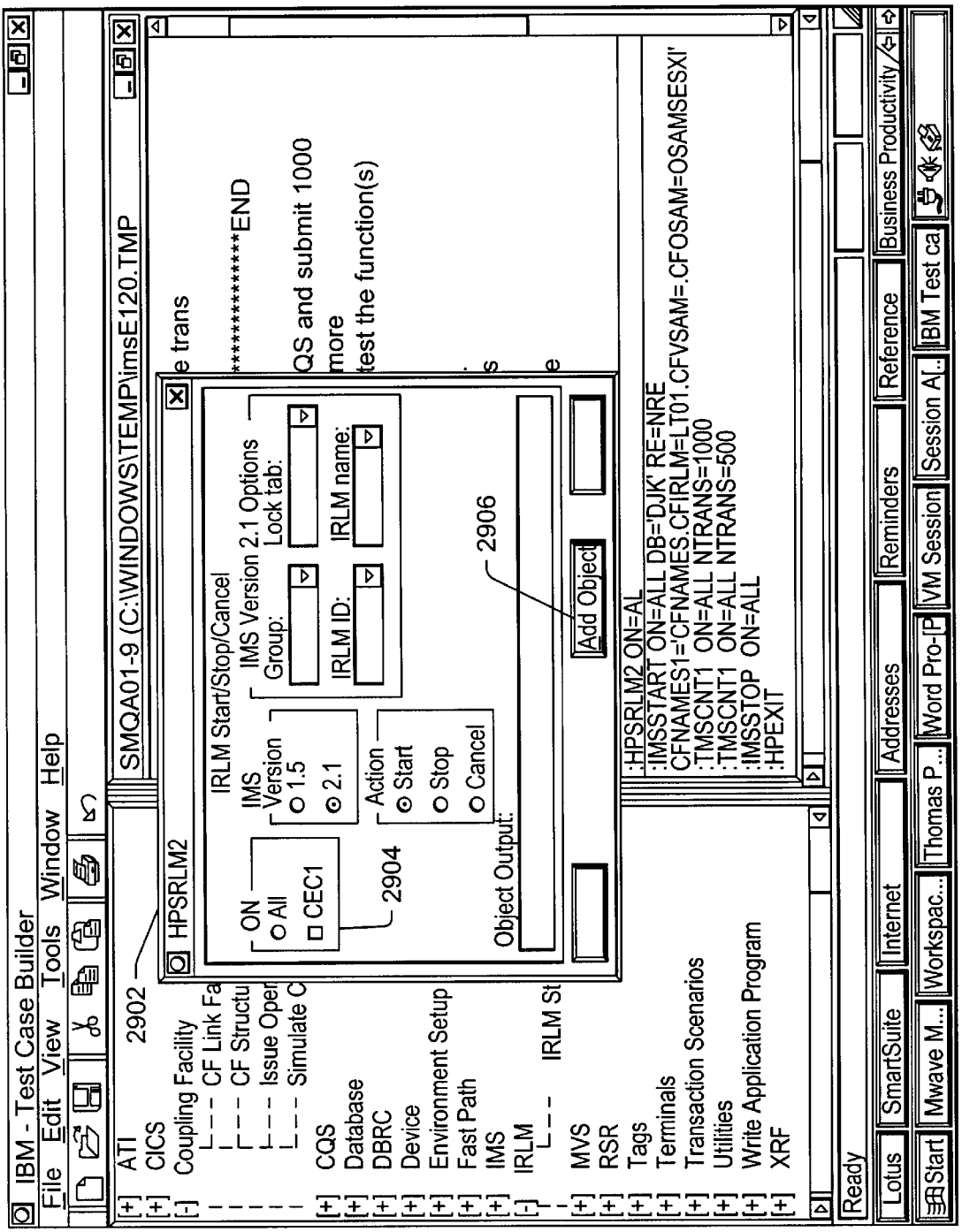
FIG. 29 is a diagram showing the test case GUI presenting an IRLM object window.

FIG. 29 is a diagram showing the test case GUI 312 presenting an IRLM object window 2902. To open this window, the user clicked on the OK button on the pop-up window 2804. The IRLM object window 2902 presents an ON frame 2904, which is highlighted in red to indicate that the ON=parameter needs to be selected. The "add object" button 2906 remains unactivated until values for all of the required parameters are entered.

Conclusion

This concludes the description of the preferred embodiments of the present invention. In summary, the present invention describes a method, apparatus, article of manufacture, for generating a test code for an automatic procedure.

The method comprises the steps of presenting a visual representation of a library of executable code objects comprising a plurality of test objects to a user, accepting a selection of a first test object in the visual representation, presenting first test object options defining at least one test parameter, accepting a selection of a first test option, translating the first test option into at least one tag and at least one tag parameter, and storing the tag and the tag parameter in a source file. The article of manufacture comprises a data storage device tangibly embodying instructions to perform the method steps described above.

The apparatus comprises means for presenting a visual representation of a library of executable code objects to a user. The library of executable code objects includes a plurality of test object members, each of which define a set of instructions for performing a portion of the test procedure. Nominally, the means for performing these function comprises a computer implementing suitable program instructions. The apparatus also comprises means, such as a computer implementing a graphical user interface, for accepting a selection of a first test object in the visual representation, presenting test options for the selected test object, and accepting a test object option. The apparatus also comprises a means for translating the first test option into at least on tag and at least one tag parameter, which is stored in s source file.

The present invention allows users to rapidly generate and debug self-documenting test cases. This is accomplished by providing the user with a library of test objects, each of which is associated with a tag. The user creates a source file using the tags to refer to the desired test objects. To further assist the user, a test case GUI is supplied that presents a visual representation of the test objects in the library and a listing of the source code. The user can compose the source code by selecting the proper location in the source code file, and selecting the appropriate test code object. The user is prompted to choose between a selection of test code object parameters, eliminating the possibility that the user will select test object parameters that do not exist or are out of range. The GUI's user prompts are also context-sensitive in that the options presented to the user can be a function of the test objects and parameter selections currently in the source code.

The present invention also provides a unified method of both generating the test code, and for generating conversational language documentation of the test code. This streamlines the test documentation process, and assures that the actual test procedures are consistent with the current test plan.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method of generating test code for performing a test procedure applyable to a system having a plurality of interconnected elements, the method comprising the steps of:

presenting a visual representation of a library of executable code objects comprising a plurality of test object members in a window, each member defining a set of instructions for performing a portion of a test procedure;

accepting a selection of a first test object in the visual representation;

presenting first test object options, the first test object options defining at least one test parameter for performing at least a portion of the test procedure;

accepting a selection of a first test object option;

translating the first test object option into at least one tag and at least one tag parameter; and storing the tag and the tag parameter in a source file.

2. The method of claim 1, further comprising the steps of generating the test code from the source file.

3. The method of claim 2, further comprising the steps of generating a scripted test plan in a conversational language from the source file.

4. The method of claim 1, wherein the library of executable code objects comprises a first test object member defining a set of instructions for performing method steps comprising the steps of:

issuing a command to a commanded system element; and intercepting a message responsive to the command from the commanded element.

5. The method of claim 1, further comprising the steps of:

accepting a selection of a second test object in the visual representation; and presenting second test object options to a user, the test object options defining at least one test parameter for performing a second portion of the test procedure, and wherein the second test object options are dependent upon the selection of first test object options.

6. The method of claim 1, wherein the visual representation of the library of executable code objects is presented in a first portion of the window, and the method further comprises the step of presenting the source file in a second portion of the window.

7. The method of claim 6, further comprising the steps of:

accepting a selection of a second tag in the source file from the window second portion, the second tag associated with a second test object;

presenting second test options for the second test object;

accepting a selection of a second test object option;

translating the second test object option into at least one second tag parameter; and storing the second tag and the second tag parameter in the source file.

8. The apparatus of claim 7, further comprising means for generating the test code from the source file.

9. The apparatus of claim 8, further comprising means for generating a scripted test plan in a conversational language from the source file.

10. An apparatus for generating test code for performing a test procedure applyable to a system having a plurality of interconnected elements, comprising:

means for presenting a visual representation of a library of executable code objects comprising a plurality of test object members in a window, each member defining a set of instructions for performing a portion of a test procedure;

means for accepting a selection of a first test object in the visual representation;

means for presenting first test object options, the first test object options defining at least one test parameter for performing at least a portion of the test procedure;

means for accepting a selection of a first test object option;

translating the first test object option into at least one tag and at least one tag parameter; and means for storing the tag and the tag parameter in a source file.

11. The apparatus of claim 10, wherein the library of executable code objects comprises a first test object member comprising:

means for issuing a command to a commanded system element; and means for intercepting a message responsive to the command from the commanded element.

12. The apparatus of claim 8, further comprising:

means for accepting a selection of a second test object in the visual representation; and means for presenting second test object options to a user, the test object options defining at least one test parameter for performing a second portion of the test procedure, and wherein the second test object options are dependent upon the selection of first test object options.

13. The apparatus of claim 10, wherein the visual representation of the library of executable code objects is presented in a first portion of the window, and the apparatus further comprises means for presenting the source file in a second portion of the window.

14. The apparatus of claim 13, further comprising:

means for accepting a selection of a second tag in the source file from the window second portion, the second tag associated with a second test object;

means for presenting second test options for the second test object;

means for accepting a selection of a second test object option;

means for translating the second test object option into at least one second tag parameter; and means for storing the second tag and the second tag parameter in the source file.

15. A program storage device, readable by a computer, tangibly embodying at least one program of instructions executable by the computer to perform method steps of generating a test code for performing a test procedure applyable to a system having a plurality of interconnected elements, the method comprising the steps of presenting a visual representation of a library of executable code objects comprising a plurality of test object members in a window, each member defining a set of instructions for performing a portion of a test procedure;

accepting a selection of a first test object in the visual representation;

presenting first test object options, the first test object options defining at least one test parameter for performing at least a portion of the test procedure;

accepting a selection of a first test object option;

translating the first test object option into at least one tag and at least one tag parameter; and storing the tag and the tag parameter in a source file.

16. The program storage device of claim 15, wherein the method steps further comprise the method steps of generating the test code from the source file.

17. The program storage device of claim 16, wherein the method steps further comprise the steps of generating a scripted test plan in a conversational language from the source file.

18. The program storage device of claim 15, wherein the library of executable code objects comprises a first test object member defining a set of instructions for performing method steps comprising the steps of:

issuing a command to a commanded system element; and intercepting a message responsive to the command from the commanded element.

19. The program storage device of claim 15, wherein the method steps further comprise the steps of:

accepting a selection of a second test object in the visual representation; and presenting second test object options to the user, the test object options defining at least one test parameter for performing a second portion of the test procedure, and wherein the second test object options are dependent upon the selection of first test object options.

20. The program storage device of claim 15, wherein the visual representation of the library of executable code objects is presented in a first portion of the window, and the method steps further comprise the method step of presenting the source file in a second portion of the window.

21. The program storage device of claim 20, wherein the method steps further comprise the steps of:

accepting a selection of a second tag in the source file from the window second portion, the second tag associated with a second test object;

presenting second test options for the second test object;

accepting a selection of a second test object option;

translating the second test object option into at least one second tag parameter; and storing the second tag and the second tag parameter in the source file.

* * * * *